United States Patent
Li

(10) Patent No.: US 12,260,123 B1
(45) Date of Patent: Mar. 25, 2025

(54) METHOD AND APPARATUS FOR PERFORMING DATA ACCESS CONTROL OF MEMORY DEVICE WITH AID OF PREDICTED INFORMATION

(71) Applicant: Silicon Motion, Inc., Hsinchu County (TW)

(72) Inventor: Fahao Li, Shenzhen (CN)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/370,379

(22) Filed: Sep. 19, 2023

(30) Foreign Application Priority Data

Sep. 8, 2023 (CN) .......................... 202311157706.4

(51) Int. Cl.
G06F 3/06 (2006.01)

(52) U.S. Cl.
CPC .......... *G06F 3/0659* (2013.01); *G06F 3/0619* (2013.01); *G06F 3/0679* (2013.01)

(58) Field of Classification Search
CPC ..... G06F 3/0659; G06F 3/0619; G06F 3/0679
USPC .................................................. 711/154, 100
See application file for complete search history.

(56) References Cited

U.S. PATENT DOCUMENTS

| | | | |
|---|---|---|---|
| 2017/0345489 A1 | 11/2017 | Zeng | |
| 2018/0181462 A1 | 6/2018 | Shukla | |
| 2019/0056994 A1 | 2/2019 | Shulkin | |
| 2022/0027083 A1* | 1/2022 | Zuolo | .................. G11C 29/021 |

FOREIGN PATENT DOCUMENTS

TW          201737262 A    10/2017

* cited by examiner

*Primary Examiner* — Hosain T Alam
*Assistant Examiner* — Zubair Ahmed
(74) *Attorney, Agent, or Firm* — Winston Hsu

(57) ABSTRACT

A method for performing data access control of a memory device and associated apparatus are provided. The method may include: receiving a plurality of host commands from a host device, for performing data access including data reading on the NV memory according to the plurality of host commands; and performing a reading parameter learning procedure to generate predicted data of a predicted reading voltage parameter offset regarding adjustment of a reading voltage parameter, for maintaining correctness of the data reading, for example: scanning for a best value, and adding latest information comprising the best value into a data set among one or more data sets in at least one reading-voltage control database; performing local linear regression according to the data set to update a reading voltage prediction function corresponding to a reading voltage prediction model; and generating or updating the predicted data according to the reading voltage prediction function.

11 Claims, 10 Drawing Sheets

METHOD AND APPARATUS FOR PERFORMING DATA ACCESS CONTROL OF MEMORY DEVICE WITH AID OF PREDICTED INFORMATION

BACKGROUND OF THE INVENTION

1. Field of the Invention

The present invention is related to memory control, and more particularly, to a method and apparatus for performing data access control of a memory device with aid of predicted information.

2. Description of the Prior Art

A memory device may comprise a Flash memory for storing data, and the management of accessing the Flash memory is complicated. For example, the memory device may be a memory card, a solid state drive (SSD), or an embedded storage device such as that conforming to Universal Flash Storage (UFS) specification. When a manufacturer tries to implement some features of the memory device according to existing specification, some problems may occur. More particularly, the memory device may spend too much time on performing some internal operations of the memory device in response to host-side requests, causing the overall performance to be reduced. The related art tries to correct the problem, but further problems such as some side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing data access control of a memory device with aid of predicted information, in order to solve the above-mentioned problems.

At least one embodiment of the present invention provides a method for performing data access control of a memory device with aid of predicted information, where the method can be applied to a memory controller of the memory device. The memory device may comprise the memory controller and a non-volatile (NV) memory, and the NV memory may comprise at least one NV memory element (e.g., one or more NV memory elements). The method may comprise: receiving a plurality of host commands from a host device, for performing data access on the NV memory according to the plurality of host commands, wherein the data access comprises data reading; and performing a reading parameter learning procedure to generate predicted data of a predicted reading voltage parameter offset regarding adjustment of a reading voltage parameter, for maintaining correctness of the data reading. For example, the reading parameter learning procedure may comprise: scanning for a best value regarding the adjustment of the reading voltage parameter, and adding latest information comprising the best value into a data set among one or more data sets in at least one reading-voltage control database; performing local linear regression according to the data set to update a reading voltage prediction function corresponding to a reading voltage prediction model, for fitting a local curve of the predicted reading voltage parameter offset into a corresponding local trend of the data set; and generating or updating the predicted data of the predicted reading voltage parameter offset according to the reading voltage prediction function.

In addition to the above method, the present invention also provides a memory controller of a memory device, where the memory device comprises the memory controller and a NV memory. The NV memory may comprise at least one NV memory element (e.g., one or more NV memory elements). In addition, the memory controller comprises a processing circuit that is arranged to control the memory controller according to a plurality of host commands from a host device, to allow the host device to access the NV memory through the memory controller. The memory controller further comprises a transmission interface circuit, and the transmission interface circuit is arranged to perform communications with the host device. Additionally, the memory controller receives the plurality of host commands from the host device through the transmission interface circuit of the memory controller, for performing data access on the NV memory according to the plurality of host commands, wherein the data access comprises data reading; and the memory controller performs a reading parameter learning procedure to generate predicted data of a predicted reading voltage parameter offset regarding adjustment of a reading voltage parameter, for maintaining correctness of the data reading. For example, the reading parameter learning procedure may comprise: scanning for a best value regarding the adjustment of the reading voltage parameter, and adding latest information comprising the best value into a data set among one or more data sets in at least one reading-voltage control database; performing local linear regression according to the data set to update a reading voltage prediction function corresponding to a reading voltage prediction model, for fitting a local curve of the predicted reading voltage parameter offset into a corresponding local trend of the data set; and generating or updating the predicted data of the predicted reading voltage parameter offset according to the reading voltage prediction function.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

The present invention method and apparatus can guarantee that the memory device can operate properly in various situations, and more particularly, prevent spending too much time on performing some internal operations (e.g., read retry operations) of the memory device in response to host-side requests. In addition, the present invention method and apparatus can solve the related art problems without introducing any side effect or in a way that is less likely to introduce a side effect.

These and other objectives of the present invention will no doubt become obvious to those of ordinary skill in the art

DETAILED DESCRIPTION

Figure 1:
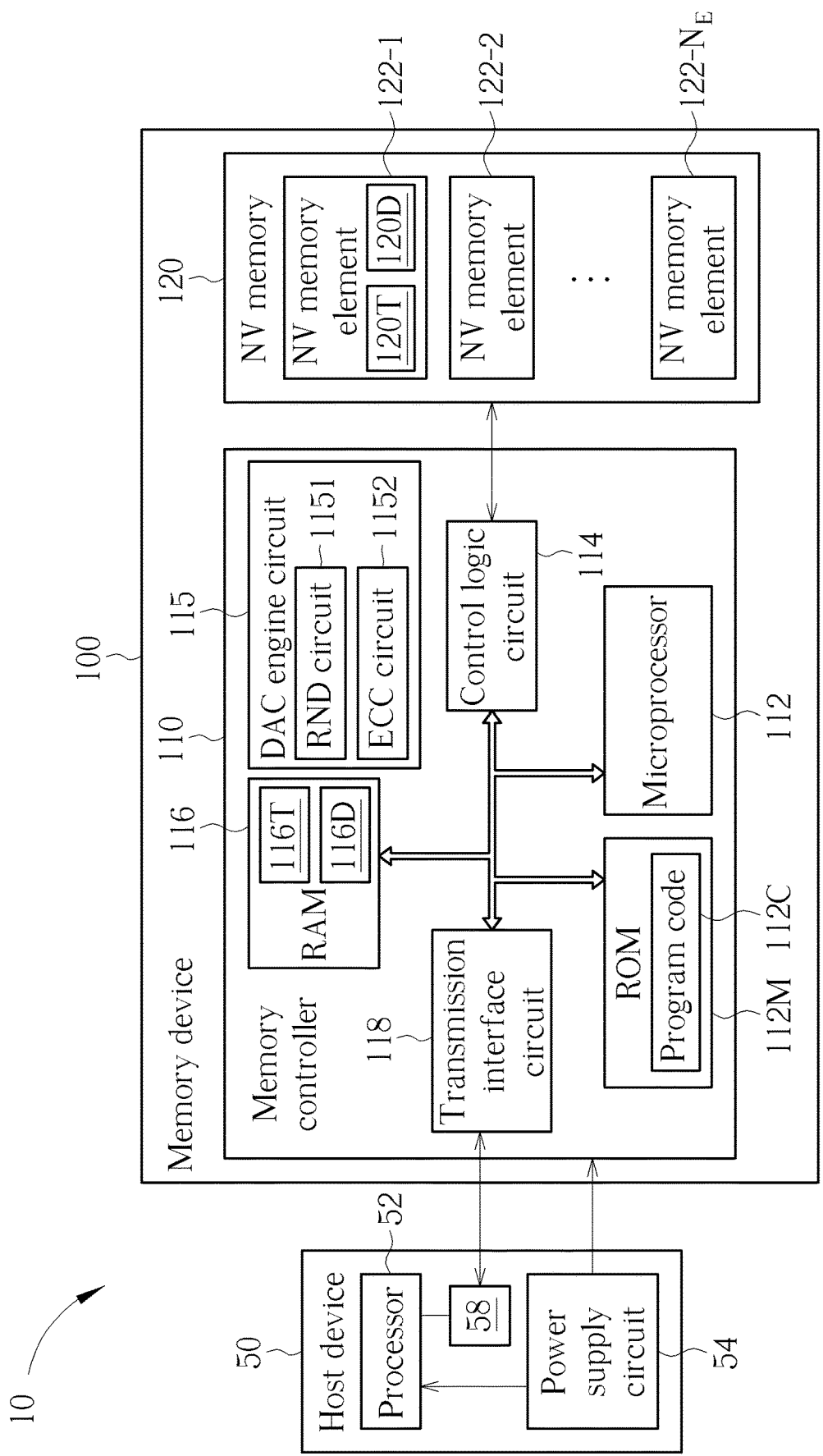
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the memory controller 110 is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-$N_E$, where "$N_E$" may represent a positive integer that is greater than one. For example, the NV memory 120 may be a flash memory, and the plurality of NV memory elements 122-1, 122-2, . . . , and 122-$N_E$ may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a data access control (DAC) engine circuit 115, a random access memory (RAM) 116 (which may be implemented by way of static random access memory (SRAM), for example), and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The DAC engine circuit 115 may be arranged to perform data access control for the memory controller 110, and more particularly, may comprise a randomization circuit 1151 (labeled "RND circuit" for brevity) and an error correction code (ECC) circuit 1152, where the randomization circuit 1151 may perform randomization on the write data (e.g., the data to be written into the NV memory 120, during performing writing/programming upon the NV memory 120 in response to a write command from the host device 50) and perform de-randomization on the read data (e.g., the data read from the NV memory 120, during performing reading upon the NV memory 120 in response to a read command from the host device 50), and the ECC circuit 1152 may perform ECC encoding on the write data and perform ECC decoding on the read data, in order to protect data and/or perform error correction, but the present invention is not limited thereto. According to some embodiments, at least one portion (e.g., a portion or all) of the DAC engine circuit 115, such as the randomization circuit 1151 and the ECC circuit 1152, may be integrated into the control logic circuit 114. Regarding the write data, the ECC circuit 1152 may perform ECC encoding on the data to be written into the NV memory 120, to generate encoded data, and the randomization circuit 1151 may perform randomization on the encoded data to generate randomized data, for being programmed into the NV memory 120. Regarding the read data, the randomization circuit 1151 may perform de-randomization on a read out version of the randomized data stored in the NV memory 120, to generate a read out version of the encoded data, and the ECC circuit 115_2 may perform ECC decoding on the read out version of the encoded data to correct any error thereof, for returning an error-free version of the encoded data to the host device 50.

The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, Non-Volatile Memory Express (NVMe) specification, embedded Multi Media Card (eMMC) specification, and Universal Flash Storage (UFS) specification), and may perform communications with the host device 50 (or the transmission interface circuit 58 therein) according to the one or more communications specifications for the memory device 100. Similarly, the transmission interface circuit 58 may conform to the one or more communications specifications, and may perform communications with the memory device 100 (or the transmission interface circuit 118 therein) according to the one or more communications specifications for the host device 50.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programming upon the memory units or data pages of corresponding physical addresses within the NV memory 120, where the physical addresses can be associated with the logical addresses. For example, the memory controller 110 may generate or update at least one logical-to-physical (L2P) address mapping table to manage the relationship between the physical addresses and the logical addresses, where the NV memory 120 may store a global L2P address mapping table 120T, for the memory controller 110 to control the memory device 100 to access data in the NV memory 120, but the present invention is not limited thereto. In addition, the memory controller 110 may generate or update at least one reading-voltage control database such as a reading-voltage control database 120D, and the NV memory 120 may store the reading-voltage control database 120D. The memory controller 110 may generate or update reading-voltage control information (e.g., at least one data set related to the reading voltage of the NV memory 120) in the reading-voltage control database 120D, for performing reading voltage control.

For better comprehension, the global L2P address mapping table 120T and the reading-voltage control database 120D may be located in a predetermined region within the NV memory element 122-1, such as a system region, but the present invention is not limited thereto. For example, the global L2P address mapping table 120T may be divided into a plurality of local L2P address mapping tables, and the local L2P address mapping tables may be stored in one or more of the NV memory elements 122-1, 122-2, . . . , and 122-$N_E$, and more particularly, may be stored in the NV memory elements 122-1, 122-2, . . . , and 122-$N_E$, respectively. When there is a needed, the memory controller 110 may load at least one portion (e.g., a portion or all) of the global L2P address mapping table 120T into the RAM 116 or other memories. For example, the memory controller 110 may load a local L2P address mapping table among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto. In addition, the memory controller 110 may load the reading-voltage control database 120D into the RAM 116 or any other memory. For example, the memory controller 110 may load the reading-voltage control database 120D into the RAM 116 to be a temporary reading-voltage control database 116D, in order to performing reading voltage control according to the temporary reading-voltage control database 116D. The memory controller 110 may generate or update reading-voltage control information (e.g., at least one data set related to the reading voltage of the NV memory 120) in the reading-voltage control database 116D, and update the reading-voltage control database 120D according to the latest reading-voltage control information in the reading-voltage control database 116D.

In addition, the aforementioned at least one NV memory element (e.g., the one or more NV memory elements such as {122-1, 122-2, . . . , 122-$N_E$}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-$n$ (where "n" may represent any integer in the interval [1, $N_E$]) among the NV memory elements 122-1, 122-2, . . . , and 122-$N_E$ may comprise multiple blocks, and a block within the multiple blocks may comprise and record a specific number of pages, where the memory controller 110 may access a certain page of a certain block within the multiple blocks according to a block address and a page address.

According to some embodiments, as a reading voltage drift phenomenon regarding the NV memory 120 (or the NV memory elements 122-1, 122-2, . . . , and 122-$N_E$ therein) may occur, the memory controller 110 may try to obtain an optimal reading voltage Vth_Opt for performing reading upon the NV memory 120, in order to read the data correctly, where the reading voltage may be referred to as the threshold voltage according to some viewpoints, and therefore may be expressed with the symbol "Vth" for better comprehension, but the present invention is not limited thereto.

Figure 2:
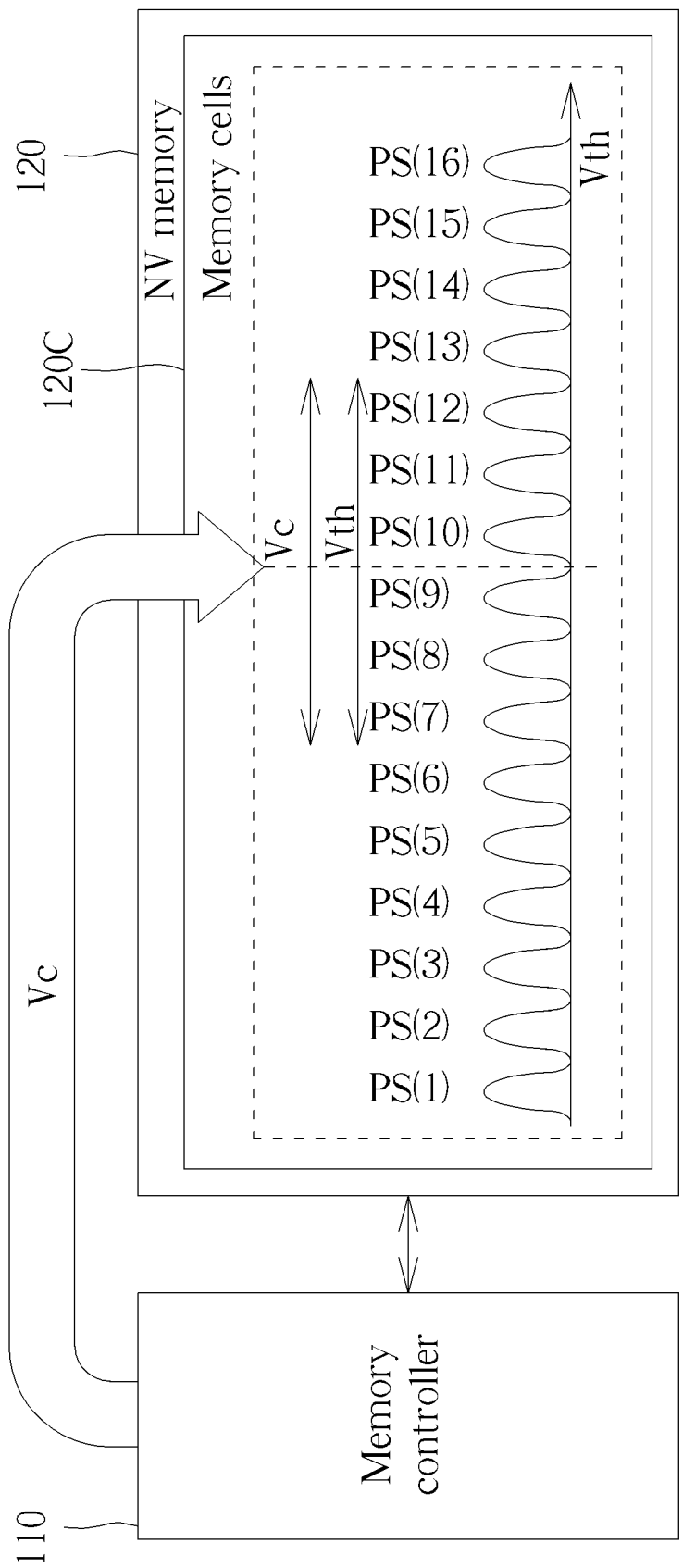
FIG. 2 is a diagram illustrating a reading voltage code control scheme according to an embodiment of the present invention.

FIG. 2 is a diagram illustrating a reading voltage code control scheme according to an embodiment of the present invention. The memory cells 120C of a memory cell group in the NV memory 120 may comprise a set of memory cells among multiple memory cells of the aforementioned any NV memory element 122-$n$. Assuming that "Y" may represent a positive integer and "y" may be an integer in the interval [1, Y], any memory cell of the memory cells 120C may be in a programming state PS(y) selected from multiple candidate programming states {PS(1), . . . , PS(Y)}(e.g., Y=16). As shown in FIG. 2, when there is a need, the memory controller 110 may send a reading voltage code Vc to the NV memory 120, to configure the reading voltage Vth corresponding to the reading voltage code Vc. For example, the reading voltage Vth may be positively correlated with the reading voltage code Vc and/or there may be a linear relationship between the reading voltage Vth and the reading voltage code Vc, and the reading voltage code Vc may be regarded as a representative of the reading voltage Vth, but the present invention is not limited thereto. In addition, the memory controller 110 may dynamically adjust the reading voltage code Vc to dynamically adjust the reading voltage Vth, in order to accurately determine the respective programming states {PS(y)} of the memory cells 120C, and therefore correctly determine the bit information corresponding to the programming state PS(y). For example, in a situation where Y=16, any candidate programming state PS among the candidate programming states {PS(1), . . . , PS(16)} may be associated with a corresponding bit sequence among the bit sequences {0000, 0001, . . . , 1111} according to a gray code, and the aforementioned any candidate programming state PS may represent the corresponding bit sequence, but the present invention is not limited thereto. According to some embodiments, the relationships between the bit sequences {0000, 0001, . . . , 1111} and the candidate programming states {PS(1), . . . , PS(16)} may vary.

For better comprehension, the memory cells 120C may be configured as quad-level cells (QLCs), and the candidate programming state count Y may be equal to 16, and therefore the multiple candidate programming states {PS(1), . . . , PS(Y)} may be illustrated to be the candidate programming states {PS(1), . . . , PS(16)} as shown in FIG. 2, but the present invention is not limited thereto. The memory cells 120C may be configured as any type of memory cells among multiple types of memory cells. For example, the memory cells 120C may be configured as single-level cells (SLCs), for storing 1 bit per cell in the NV memory element 122-n, where $Y=2^1=2$; the memory cells 120C may be configured as multi-level cells (MHLCs) such as double-level cells (DLCs), for storing 2 bits per cell in the NV memory element 122-n, where $Y=2^2=4$; the memory cells 120C may be configured as triple-level cells (TLCs), for storing 3 bits per cell in the NV memory element 122-n, where $Y=2^3=8$; the memory cells 120C may be configured as the QLCs, for storing 4 bits per cell in the NV memory element 122-n, where $Y=2^4=16$; the memory cells 120C may be configured as penta-level cells (PLCs), for storing 5 bits per cell in the NV memory element 122-n, where $Y=2^5=32$; and the rest may be deduced by analogy.

Figure 3:
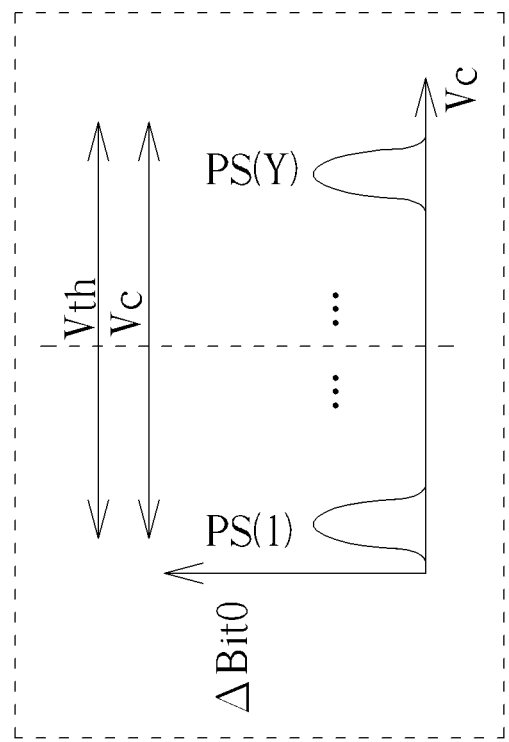
FIG. 3 is a diagram illustrating a programming-state monitoring control scheme according to an embodiment of the present invention.
Figure 3:
Figure 3:
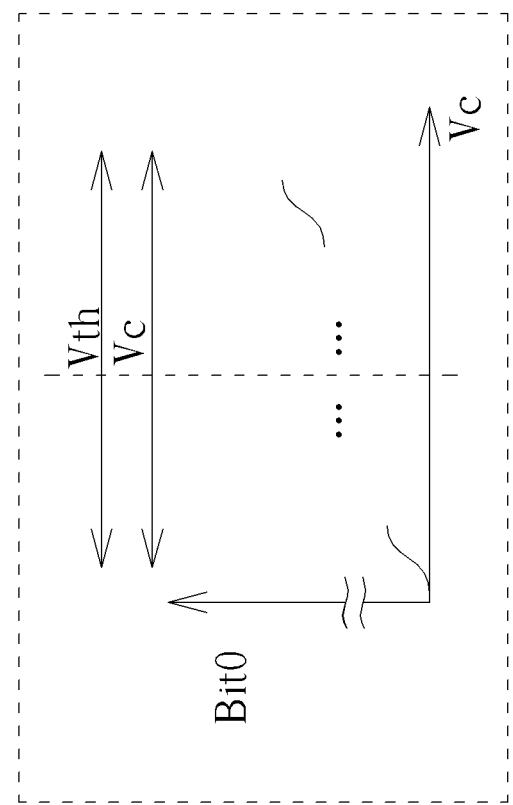

FIG. 3 is a diagram illustrating a programming-state monitoring control scheme according to an embodiment of the present invention. The memory controller 110 may increase or decrease the reading voltage code Vc to increase or decrease the reading voltage Vth correspondingly, and read the memory cells 120C according to the reading voltage Vth to monitor the bit-zero count Bit0 of the raw data bits which are equal to zero among the respective raw data bits of the memory cells 120C. For example, the bit-zero count Bit0 may represent the number of memory cells outputting the raw data of bit 0 among the memory cells 120C in a situation where the memory controller 110 controls the NV memory 120 to read the memory cells 120C according to the reading voltage Vth. The memory controller 110 may monitor the bit-zero count Bit0, in order to obtain multiple monitored values indicating multiple relationships between the bit-zero count Bit0 and the reading voltage code Vc (or the reading voltage Vth), and/or a curve of the bit-zero count Bit0 with respect to the reading voltage code Vc (or the reading voltage Vth). In addition, the memory controller 110 may determine the variations of the bit-zero count Bit0 with respect to the reading voltage code Vc (or the reading voltage Vth), and more particularly, calculate the difference between any two adjacent monitored values of the bit-zero count Bit0 along the Vc axis (or the Vth axis) to be the variation of the bit-zero count Bit0 at a corresponding point on the Vc axis (or the Vth axis), in order to obtain multiple difference values indicating multiple relationships between the bit-zero count variation ΔBit0 and the reading voltage code Vc (or the reading voltage Vth), and/or a curve of the bit-zero count variation ΔBit0 with respect to the reading voltage code Vc (or the reading voltage Vth). As a result, the curve of the bit-zero count variation ΔBit0 with respect to the reading voltage code Vc (or the reading voltage Vth) may have partial curves respectively corresponding to the multiple candidate programming states {PS(1), . . . , PS(Y)}.

According to some embodiments, when reading the memory cells 120C according to the reading voltage Vth, the memory controller 110 may obtain the raw data (e.g., a raw data bit such as "1" or "0", read according to the reading voltage Vth) of a memory cell among the memory cells 120C from the NV memory 120. For example, the memory cells in the NV memory 120 may be implemented by way of floating-gate metal-oxide-semiconductor field-effect transistors (MOSFETs), and whether a current can flow through a channel (e.g., an n-channel) of a memory cell easily under a control gate voltage of the memory cell may depend on the number of charges (e.g., electrons) stored in the memory cell, where the raw data such as "0" may indicate that the reading voltage Vth as well as the control gate voltage are high enough to allow the current to flow through the channel, and the raw data such as "1" may indicate that the reading voltage Vth as well as the control gate voltage are insufficient for the current to flow through the channel, but the present invention is not limited thereto. According to some embodiments, the architecture of the memory cells in the NV memory 120 may vary.

Figure 4:
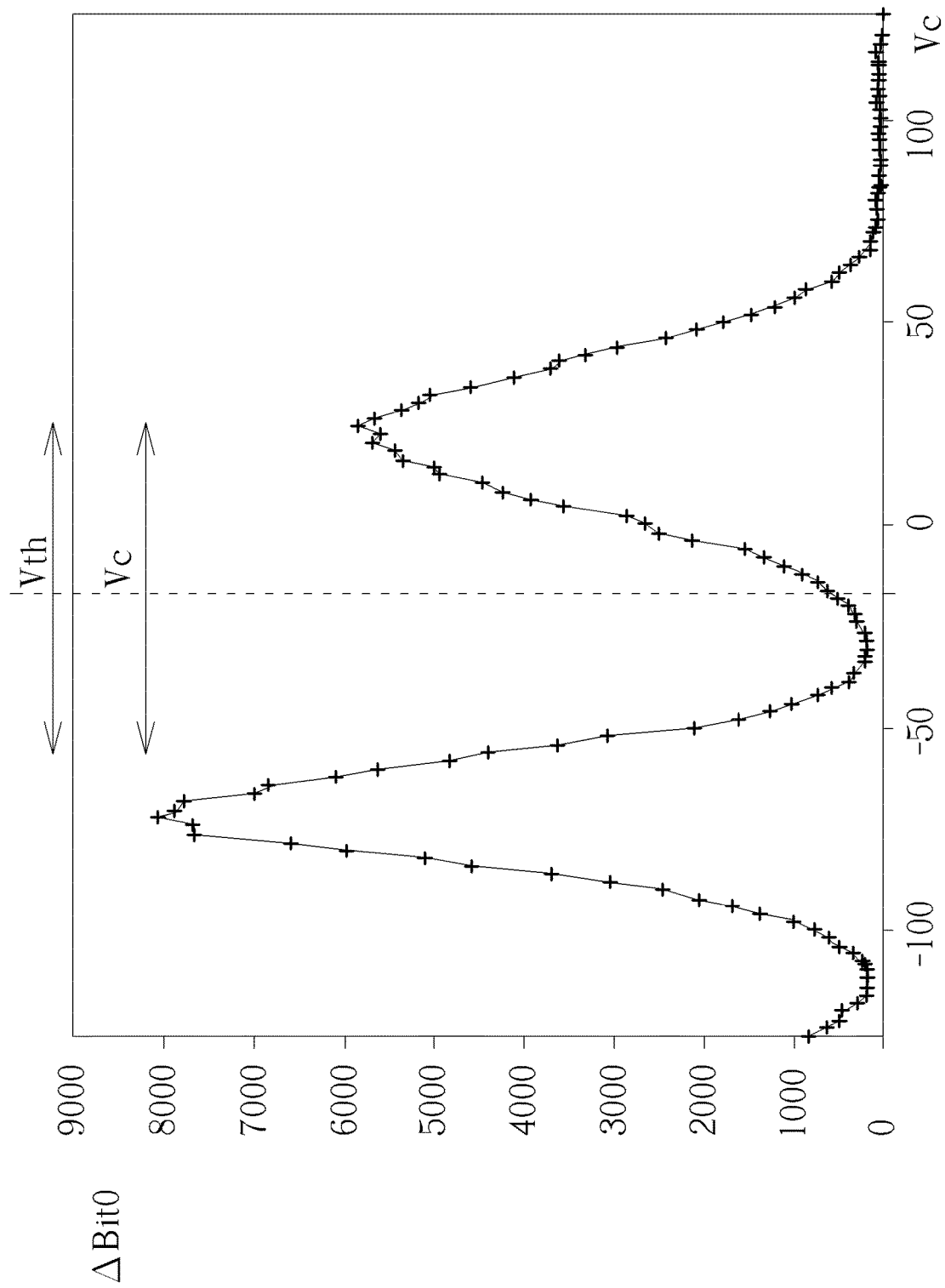
FIG. 4 is a diagram illustrating a reading voltage scanning control scheme according to an embodiment of the present invention.

FIG. 4 is a diagram illustrating a reading voltage scanning control scheme according to an embodiment of the present invention, where the horizontal axis may represent the reading voltage code Vc corresponding to the reading voltage Vth, and the vertical axis may represent the bit-zero count variation ΔBit0 corresponding to the bit-zero count Bit0. For example, the memory cell group may comprise at least one portion of memory cells (e.g., a portion of memory cells, or all memory cells) among the multiple memory cells of the aforementioned any NV memory element 122-n, and the respective programming states {PS(y)} of the memory cells in the memory cell group may vary and may have a certain distribution with respect to the reading voltage code Vc (or the reading voltage Vth). Regarding the memory cell group, the curve shown in FIG. 4 may indicate a portion of relationships among the multiple relationships between the bit-zero count variation ΔBit0 and the reading voltage code Vc (or the reading voltage Vth), but the present invention is not limited thereto. According to some embodiments, the range of the reading voltage code Vc, the range of the bit-zero count variation ΔBit0, and/or the curve shown in FIG. 4 may vary. According to some embodiments, the memory cell group may comprise the memory cells of the NV memory elements 122-1, 122-2, . . . , and 122-$N_E$.

For example, assuming that V_a≥V_min and V_b≤V_max, the memory controller 110 may select a predetermined reading voltage range [V_a, V_b](e.g., the range between the reading voltages V_a and V_b) among an adjustable reading voltage range [V_min, V_max](e.g., the range between the minimum reading voltage V_min and the maximum reading voltage V_max), and scan the predetermined reading voltage range [V_a, V_b] with a fixed step size V_step, and more particularly, read the memory cells of the memory cell group according to the reading voltages {V_a, (V_a+V_step), (V_a+(2*V_step)), . . . , V_b} to obtain the associated information, respectively. The memory controller 110 may determine at least one local minimum of the bit-zero count variation ΔBit0 (e.g., a local minimum of the curve shown in FIG. 4) according to the relationships between the bit-zero count variation ΔBit0 and the reading voltage code Vc, for distinguishing any two adjacent candidate programming states {PS} among the multiple candidate programming states {PS(1), ..., PS(Y)} regarding the memory cell group. When using the reading voltage code Vc as the representative of the reading voltage Vth, the memory controller 110 may select a predetermined reading voltage code range [Vc_a, Vc_b](e.g., the range between the reading voltage codes Vc_a and Vc_b respectively corresponding to the reading voltages V_a and V_b) among an adjustable reading voltage code range [Vc_min, Vc_max](e.g., the range between the minimum reading voltage code Vc_min and the maximum reading voltage code Vc_max respectively corresponding to the minimum reading voltage V_min and the maximum reading voltage V_max), and scan the predetermined reading voltage code range [Vc_a, Vc_b] with a fixed step size Vc_step (e.g., Vc_step=1) corresponding to the fixed step size V_step. Taking the QLCs cell as an example of the memory cells 120C, the memory controller 110 may perform similar scanning operations to determine 15 values on the Vc axis (or the Vth axis) that correspond to 15 local minimums of the bit-zero count variation ΔBit0, to be 15 optimal reading voltage codes {Vc_Opt}(or 15 optimal reading voltages {Vth_Opt}) for distinguishing the candidate programming states {PS(1), ..., PS(16)}.

As the number of charges in the memory cells may change with respect to time due to some reasons, the programming states {PS(y)} in the memory cell group may change correspondingly. When a read error occurs, the memory controller 110 may perform a read retry procedure to try reading the NV memory 120 with one or more adjusted reading voltages, in order to correct the read error. For example, the memory controller 110 may perform reading voltage adjustment according to the reading voltage scanning control scheme, to accurately determine the respective programming states {PS(y)} of the memory cells in the memory cell group, and therefore correctly determine the respective bit information of the memory cells in the memory cell group, but the present invention is not limited thereto. According to some embodiments, the memory controller 110 may establish a reading voltage prediction model corresponding to the aforementioned at least one reading-voltage control database (e.g., the reading-voltage control database 116D and/or the reading-voltage control database 120D) and perform reading voltage prediction according to the reading voltage prediction model for adjusting the reading voltage Vth, having no need to calculate the bit-zero count variation ΔBit0, in order to enhance the overall performance.

Figure 5:
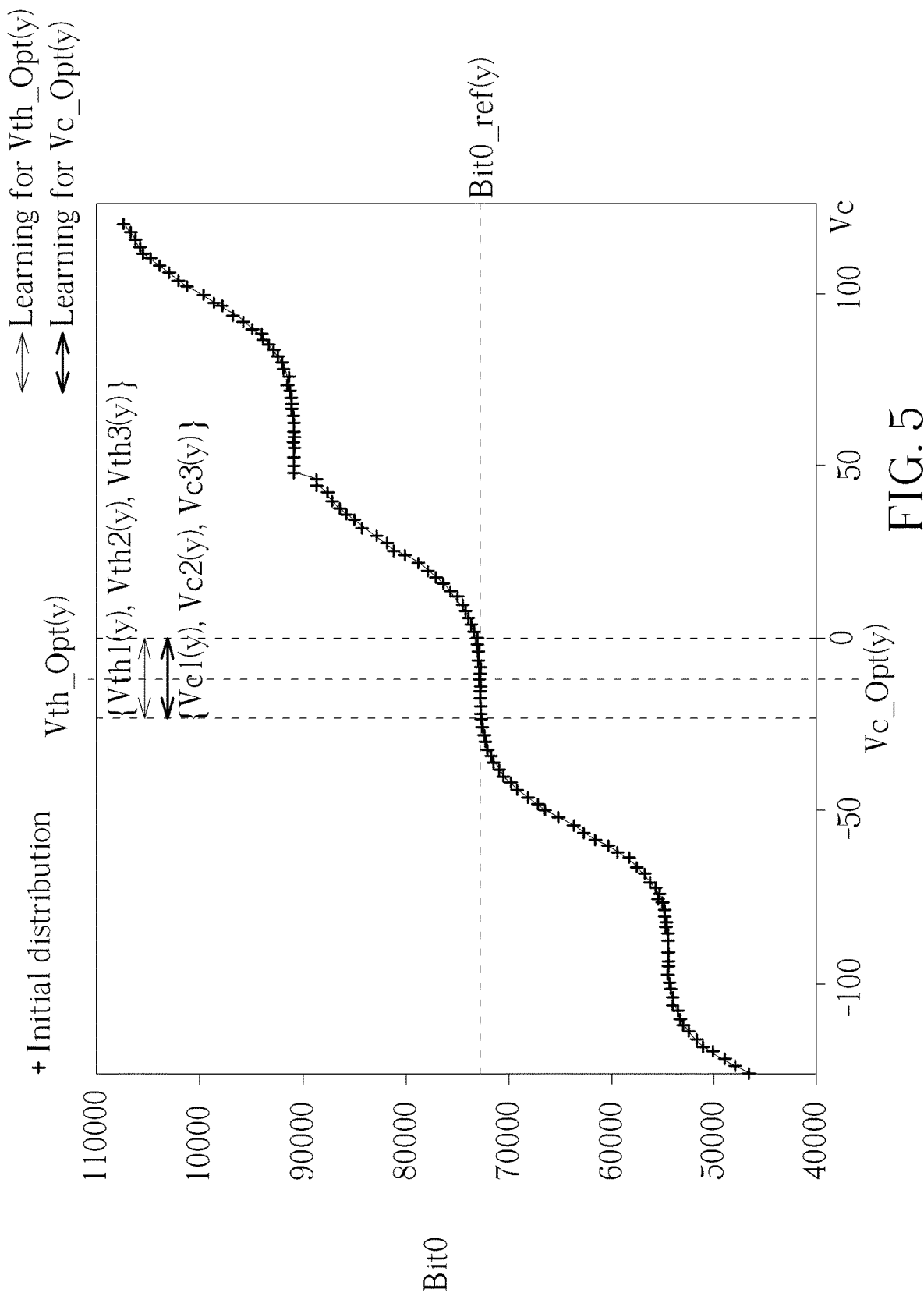
FIG. 5 is a diagram illustrating a reading voltage learning control scheme of a method for performing data access control of a memory device with aid of predicted information according to an embodiment of the present invention.

FIG. 5 is a diagram illustrating a reading voltage learning control scheme of a method for performing data access control of a memory device with aid of predicted information according to an embodiment of the present invention. The memory controller 110 may set or adjust the reading voltage code Vc to set or adjust the reading voltage Vth, and monitor the bit-zero count Bit0 to perform learning for an optimal reading voltage code Vc_Opt(y) (e.g., an optimal value of the reading voltage code Vc) corresponding to a reference bit-zero count Bit0_ref(y) (e.g., a reference value of the bit-zero count Bit0), and to perform learning for an optimal reading voltage Vth_Opt(y) (e.g., an optimal value of the reading voltage Vth) corresponding to the reference bit-zero count Bit0_ref(y), where the reference bit-zero count Bit0_ref(y) may be regarded as an ideal bit-zero count (e.g., an ideal value of the bit-zero count Bit0), and may be determined according to a default setting in advance to be a predetermined ideal value corresponding to a local minimum of the bit-zero count variation ΔBit0. For example, under control of a production tool of the memory device 100, the memory controller 110 may have set the reference bit-zero count Bit0_ref(y) as a fixed value such as a default bit-zero count value corresponding to the programming state index y in advance, to make the memory device 100 perform data reading for the host device 50 correctly, but the present invention is not limited thereto. According to some embodiments, the memory controller 110 may set the reference bit-zero count Bit0_ref(y) as the fixed value (e.g., the default bit-zero count value corresponding to the programming state index y) by itself, having no need to rely on the production tool of the memory device 100.

The distribution illustrated with the curve shown in FIG. 5 may be regarded as an initial distribution, and may vary with respect to time due to some reasons. As the memory controller 110 may have set the reference bit-zero count Bit0_ref(y) as the default bit-zero count value corresponding to the programming state index y, the memory controller 110 may need to perform one or more learning operations, in order to correctly determine the optimal reading voltage code Vc_Opt(y). More particularly, the memory controller 110 may collect one or more data sets into the aforementioned at least one reading-voltage control database (e.g., the reading-voltage control database 116D and/or the reading-voltage control database 120D) to establish the reading voltage prediction model. For example, the memory controller 110 may collect reading voltage code correction information (e.g., reading voltage code offsets {Vc1(y), Vc2(y), Vc3(y)}) of the reading voltage code Vc and/or reading voltage correction information (e.g., reading voltage offsets {Vth1(y), Vth2(y), Vth3(y)}) of the reading voltage Vth into the aforementioned at least one reading-voltage control database, for generating the predicted information, but the present invention is not limited thereto. According to some embodiments, the data amount and the data type regarding the correction information (e.g., the reading voltage code correction information of the reading voltage code Vc or the reading voltage correction information of the reading voltage Vth) collected in the learning operations, the range of the reading voltage code Vc, the range of the bit-zero count Bit0, and/or the curve shown in FIG. 5 may vary.

As the curve of the bit-zero count variation ΔBit0 with respect to the reading voltage code Vc (or the reading voltage Vth) may have (Y−1) local minimums (without considering the end points of the whole curve), the memory controller 110 may perform learning for (Y−1) optimal reading voltage codes {Vc_Opt(y)} such as the optimal reading voltage codes {Vc_Opt(1), ..., Vc_Opt(Y−1)}, and perform learning for (Y−1) optimal reading voltages {Vth_Opt(y)} such as the optimal reading voltages {Vth_Opt(1), ..., Vth_Opt(Y−1)}. Taking the QLCs cell as an example of the memory cells 120C, the memory controller 110 may perform similar learning operations to determine 15 values on the Vc axis (or the Vth axis) to be 15 optimal reading voltage codes {Vc_Opt(y)}(or 15 optimal reading voltages {Vth_Opt(y)}) for distinguishing the candidate programming states {PS(1), ..., PS(16)}, where the 15 optimal reading voltage codes {Vc_Opt(y)}(or the 15 optimal reading voltages {Vth_Opt(y)}) may correspond to the 15 local minimums of the bit-zero count variation ΔBit0.

Figure 6:
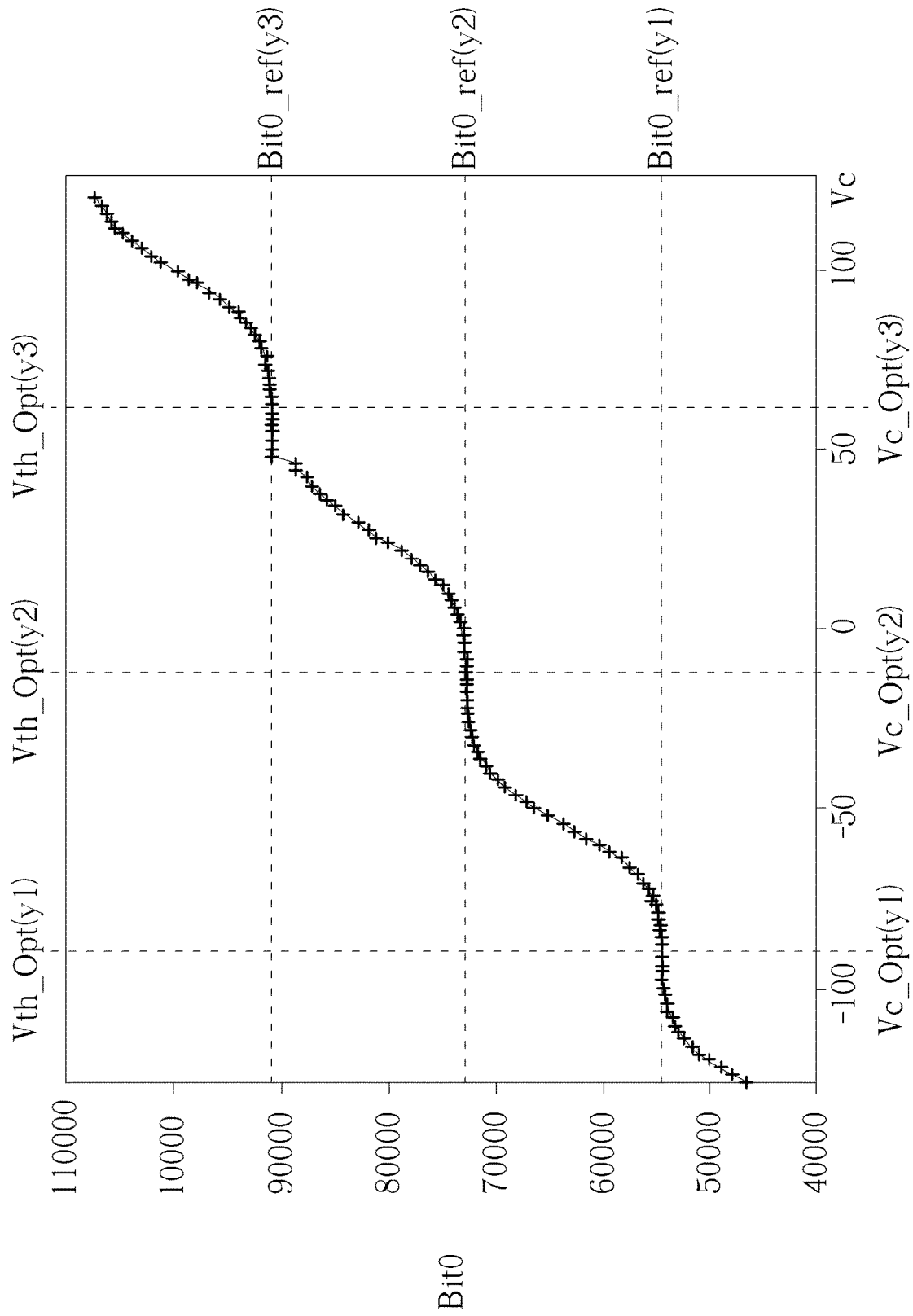
FIG. 6 is a diagram illustrating some implementation details of the reading voltage learning control scheme shown in FIG. 5 according to an embodiment of the present invention.

FIG. 6 is a diagram illustrating some implementation details of the reading voltage learning control scheme shown in FIG. 5 according to an embodiment of the present invention, where the symbols "y1", "y2" and "y3" may represent three consecutive integers in the interval [1, Y], and y1<y2<y3. For example, when y=y1, the memory controller 110 may perform leaning for the optimal reading voltage code Vc_Opt(y1) and the optimal reading voltage Vth_Opt(y1), for distinguishing the candidate programming states PS(y1) and PS(y1+1); when y=y2, the memory controller 110 may perform leaning for the optimal reading voltage code Vc_Opt(y2) and the optimal reading voltage Vth_Opt(y2), for distinguishing the candidate programming states PS(y2) and PS(y2+1); and when y=y3, the memory controller 110 may perform leaning for the optimal reading voltage code Vc_Opt(y3) and the optimal reading voltage Vth_Opt(y3), for distinguishing the candidate programming states PS(y3) and PS(y3+1); and the rest may be deduced by analogy. For brevity, similar descriptions for this embodiment are not repeated in detail here.

According to some embodiments, the reading voltage code Vc may be any integer in the interval [Vc_min, Vc_max], where Vc_min=−128 and Vc_max=+128, for example, as illustrated with the range of the reading voltage code Vc shown in any of FIGS. 4-6, but the present invention is not limited thereto. According to some embodiments, the minimum reading voltage code Vc_min and the maximum reading voltage code Vc_max may vary.

Figure 7:
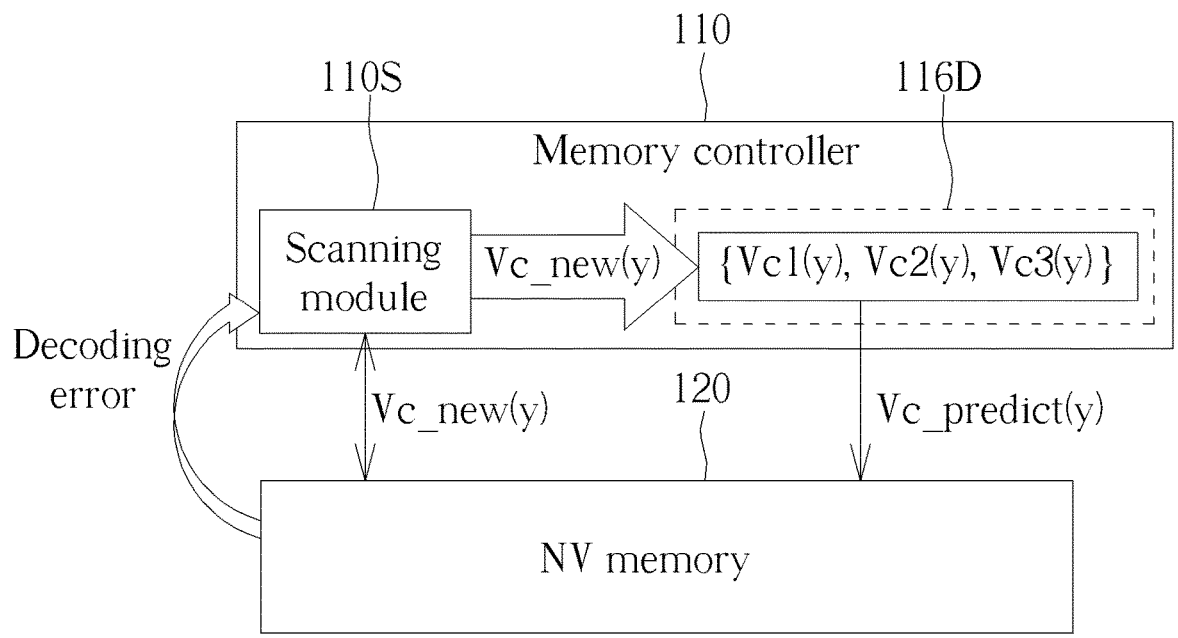
FIG. 7 is a diagram illustrating a first database update control scheme of the method according to an embodiment of the present invention.

FIG. 7 is a diagram illustrating a first database update control scheme of the method according to an embodiment of the present invention. For example, at least one firmware module running on the memory controller 110 may comprise a scanning module 110S for controlling the memory controller 110 to operate according the reading voltage scanning control scheme. In a situation where at least one decoding error (e.g., a hard decoding error and/or a soft decoding error) occurs during reading data from the NV memory 120, the memory controller 110 running the scanning module 110S may determine the latest optimal reading voltage code Vc_Opt(y), and determine at least one new reading voltage code offset Vc_new(y) of the reading voltage code Vc according to the latest optimal reading voltage code Vc_Opt(y), for being collected into the reading-voltage control database 116D. The memory controller 110 may update the reading-voltage control database 116D with the new reading voltage code offset Vc_new(y) obtained from the scanning module 110S, and more particularly, collect the reading voltage code correction information such as the new reading voltage code offset Vc_new(y) to be a portion of the reading voltage code offsets {Vc1($y$), Vc2($y$), Vc3($y$)} in the reading-voltage control database 116D, and discard at least one old reading voltage code offset in the reading-voltage control database 116D when there is a need. As a result, the memory controller 110 may perform the reading voltage prediction according to the reading voltage prediction model to generate the predicted information such as a predicted reading voltage code offset Vc_predict(y) corresponding to the reading voltage code offsets {Vc1($y$), Vc2($y$), Vc3($y$)}, in order to adjust the reading voltage Vth for performing read retry to read data correctly and efficiently without any error.

Figure 8:
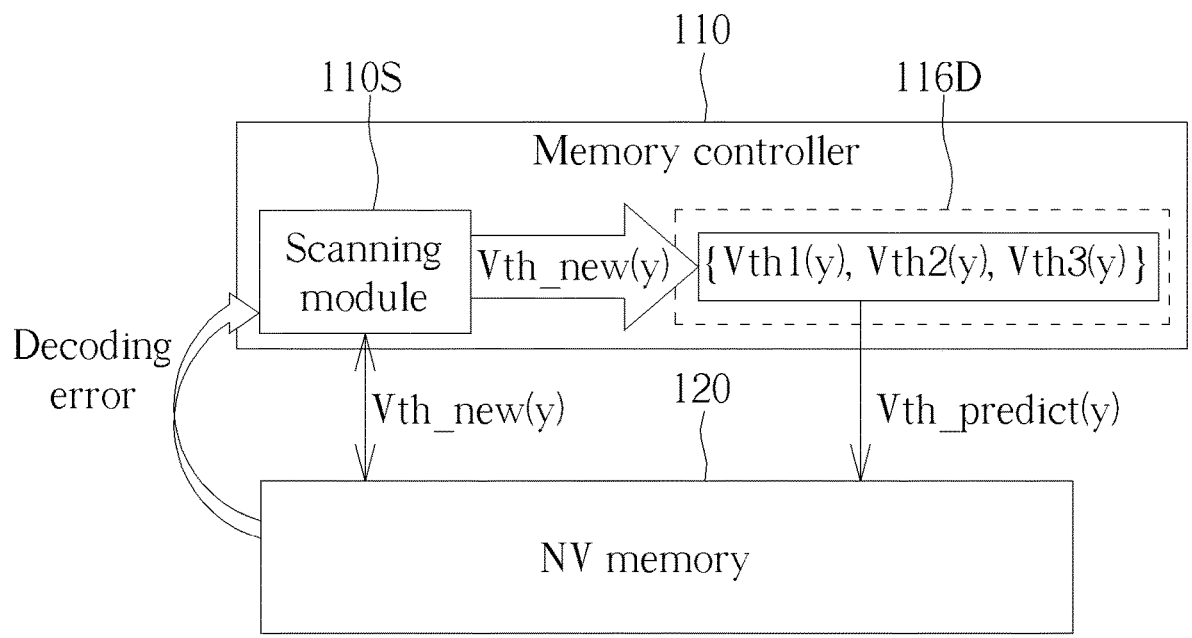
FIG. 8 is a diagram illustrating a second database update control scheme of the method according to an embodiment of the present invention.

FIG. 8 is a diagram illustrating a second database update control scheme of the method according to an embodiment of the present invention. For example, in a situation where at least one decoding error (e.g., a hard decoding error and/or a soft decoding error) occurs during reading data from the NV memory 120, the memory controller 110 running the scanning module 110S may determine the latest optimal reading voltage Vth_Opt(y), and determine at least one new reading voltage offset Vth_new(y) of the reading voltage Vth according to the latest optimal reading voltage Vth_Opt(y), for being collected into the reading-voltage control database 116D. The memory controller 110 may update the reading-voltage control database 116D with the new reading voltage offset Vth_new(y) obtained from the scanning module 110S, and more particularly, collect the reading voltage correction information such as the new reading voltage offset Vth_new(y) to be a portion of the reading voltage offsets {Vth1($y$), Vth2($y$), Vth3($y$)} in the reading-voltage control database 116D, and discard at least one old reading voltage offset in the reading-voltage control database 116D when there is a need. As a result, the memory controller 110 may perform the reading voltage prediction according to the reading voltage prediction model to generate the predicted information such as a predicted reading voltage offset Vth_predict(y) corresponding to the reading voltage offsets {Vth1($y$), Vth2($y$), Vth3($y$)}, in order to adjust the reading voltage Vth for performing read retry to read data correctly and efficiently without any error.

According to some embodiments, the reading voltage code Vc and the reading voltage Vth may be collectively referred to as the reading voltage parameter V, the optimal reading voltage code Vc_Opt(y) and the optimal reading voltage Vth_Opt(y) may be collectively referred to as the optimal reading voltage parameter V_Opt(y), and the reading voltage code offsets {Vc1($y$), Vc2($y$), Vc3($y$)} and the reading voltage offsets {Vth1($y$), Vth2($y$), Vth3($y$)} may be collectively referred to as the reading voltage parameter offsets {V1($y$), V2($y$), V3($y$)}. For example, in a situation where at least one decoding error (e.g., a hard decoding error and/or a soft decoding error) occurs during reading data from the NV memory 120, the memory controller 110 running the scanning module 110S may determine the latest optimal reading voltage parameter V_Opt(y), and determine at least one new reading voltage parameter offset V_new(y) (e.g., the aforementioned at least one new reading voltage code offset Vc_new(y) and the aforementioned at least one new reading voltage offset Vth_new(y)) of the reading voltage parameter V according to the latest optimal reading voltage parameter V_Opt(y), for being collected into the aforementioned at least one reading-voltage control database (e.g., the reading-voltage control database 116D and/or the reading-voltage control database 120D). The memory controller 110 may update the aforementioned at least one reading-voltage control database with the new reading voltage parameter offset V_new(y) obtained from the scanning module 110S, and more particularly, collect the reading voltage correction information such as the new reading voltage parameter offset V_new(y) to be a portion of the reading voltage parameter offsets {V1($y$), V2($y$), V3($y$)} in the aforementioned at least one reading-voltage control database, and discard at least one old reading voltage parameter offset in the aforementioned at least one reading-voltage control database when there is a need. As a result, the memory controller 110 may perform the reading voltage prediction according to the reading voltage prediction model to generate the predicted information such as a predicted reading voltage parameter offset V_predict(y) corresponding to the reading voltage parameter offsets {V1($y$), V2($y$), V3($y$)}, in order to adjust the reading voltage Vth for performing read retry to read data correctly and efficiently without any error.

Figure 9:
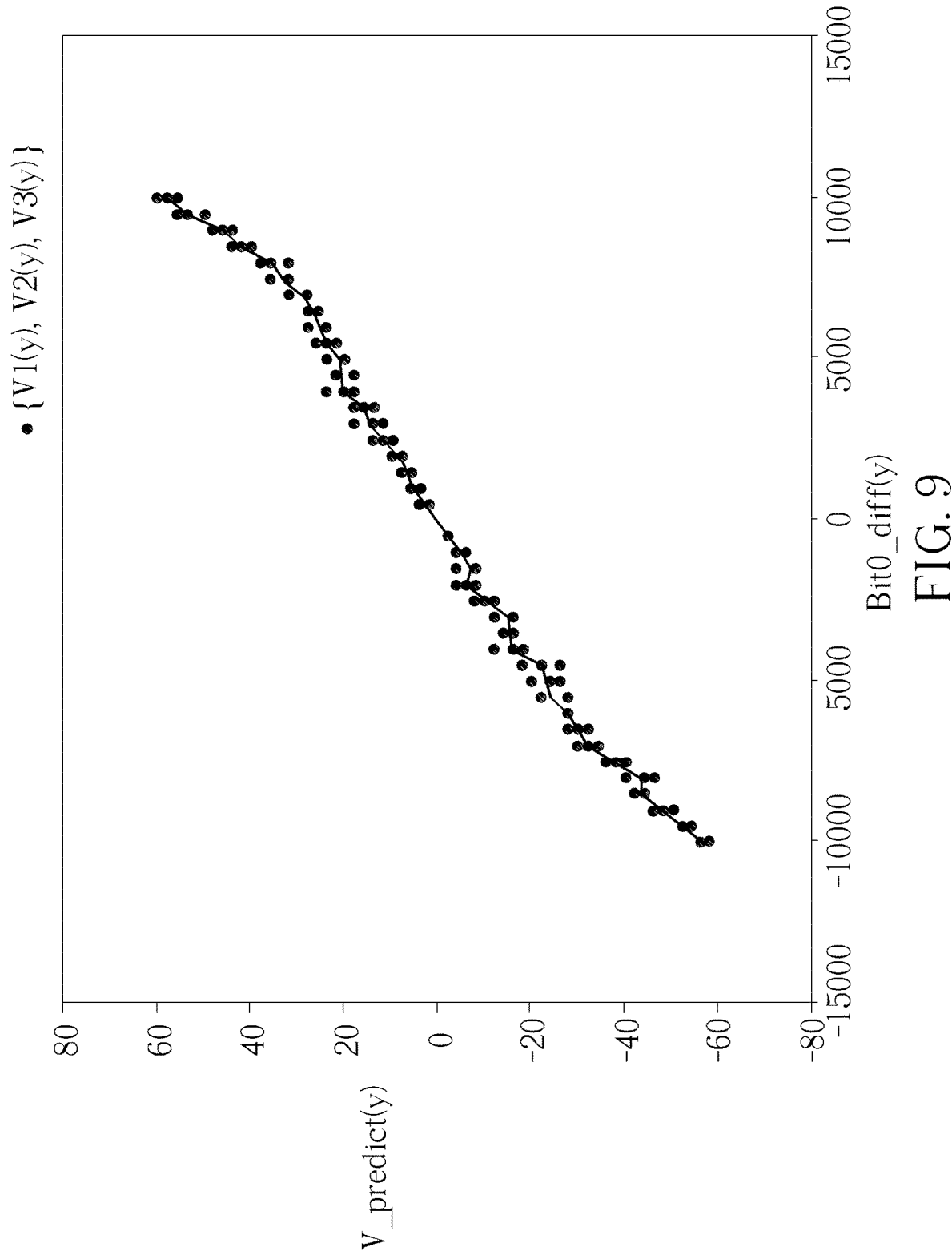
FIG. 9 is a diagram illustrating a local linear regression control scheme of the method according to an embodiment of the present invention.

FIG. 9 is a diagram illustrating a local linear regression control scheme of the method according to an embodiment of the present invention. For example, the horizontal axis may represent the bit-zero count difference Bit0_diff(y) such as the difference (Bit0−Bit0_ref(y)) between the bit-zero count Bit0 and the reference bit-zero count Bit0_ref(y), and the vertical axis may represent the predicted reading voltage parameter offset V_predict(y) corresponding to the reading voltage parameter offsets $\{V1(y), V2(y), V3(y)\}$ (e.g., the predicted reading voltage code offset Vc_predict(y) corresponding to the reading voltage code offsets $\{Vc1(y), Vc2(y), Vc3(y)\}$ or the predicted reading voltage offset Vth_predict(y) corresponding to the reading voltage offsets $\{Vth1(y), Vth2(y), Vth3(y)\}$), where the scale of the predicted reading voltage parameter offset V_predict(y) may be illustrated as the scale of the predicted reading voltage code offset Vc_predict(y) for better comprehension, but the present invention is not limited thereto. According to some embodiments, the scale of the predicted reading voltage parameter offset V_predict(y), the distribution of the reading voltage parameter offsets $\{V1(y), V2(y), V3(y)\}$, and/or the predicted reading voltage parameter offset V_predict(y) illustrated with the curve shown in FIG. 9 may vary.

The memory controller 110 may collect the one or more data sets such as that comprising the reading voltage parameter offsets $\{V1(y), V2(y), V3(y)\}$ as illustrated with the small circles shown in FIG. 9 into the aforementioned at least one reading-voltage control database (e.g., the reading-voltage control database 116D and/or the reading-voltage control database 120D) to establish the reading voltage prediction model, and perform the reading voltage prediction according to the reading voltage prediction model to generate the predicted information such as the predicted reading voltage parameter offset V_predict(y) corresponding to the reading voltage parameter offsets $\{V1(y), V2(y), V3(y)\}$ as shown in FIG. 9. For example, the memory controller 110 may perform local linear regression on the reading voltage parameter offsets $\{V1(y), V2(y), V3(y)\}$ as illustrated with the small circles shown in FIG. 9 to generate the predicted reading voltage parameter offset V_predict(y) as illustrated with the curve shown in FIG. 9, and more particularly, perform linear regression on the reading voltage parameter offsets $\{V1(y), V2(y), V3(y)\}$ according to a predetermined weighting function w to fit a local curve of the curve of the predicted reading voltage parameter offset V_predict(y) into a corresponding local trend among multiple local trends of the reading voltage parameter offsets $\{V1(y), V2(y), V3(y)\}$. As the distribution of the reading voltage parameter offsets $\{V1(y), V2(y), V3(y)\}$ over the bit-zero count difference Bit0_diff(y) may correspond to a nonlinear curve, the memory controller 110 may perform the local linear regression on the reading voltage parameter offsets $\{V1(y), V2(y), V3(y)\}$ to properly generate the predicted reading voltage parameter offset V_predict(y) for adjusting the reading voltage Vth, in order to read data correctly and efficiently without any error during read retry.

Assuming that a candidate value index i of multiple candidate values of the bit-zero count difference Bit0_diff(y) may be an integer, the multiple candidate values may be written as the multiple candidate values $\{Bit0\_diff(y, i)\}$ such as (i_max–i_min+1) candidate values $\{Bit0\_diff(y, i\_min), \ldots, Bit0\_diff(y, i\_max)\}$, and the reading voltage parameter offsets $\{V1(y), V2(y), V3(y)\}$ corresponding to any candidate value Bit0_diff(y, i) (e.g., one of the multiple candidate values $\{Bit0\_diff(y, i)\}$) may be written as the reading voltage parameter offsets $\{V1(y, i), V2(y, i), V3(y, i)\}$, where "i_max" and "i_min" may represent the maximum and the minimum of the candidate value index i, respectively. As shown in FIG. 9, for the aforementioned any candidate value Bit0_diff(y, i) among the multiple candidate values $\{Bit0\_diff(y, i)\}$, the memory controller 110 may collect three reading voltage parameter offsets V1(y, i), V2(y, i) and V3(y, i) corresponding to this candidate value Bit0_diff(y, i), but the present invention is not limited thereto. According to some embodiments, the number of reading voltage parameter offsets V1(y, i), etc. corresponding to the same candidate value Bit0_diff(y, i) that are collected by the memory controller 110 may vary. For example, assuming that a reading voltage parameter offset index j of the reading voltage parameter offsets V1(y, i), etc. may be a positive integer greater than one, there may be m reading voltage parameter offsets $\{Vj(y, i)\}$ corresponding to the same candidate value Bit0_diff(y, i), such as the reading voltage parameter offsets $\{V1(y, i), \ldots, Vm(y, i)\}$. When m=3, the reading voltage parameter offsets $\{V1(y, i), \ldots, Vm(y, i)\}$ may represent the reading voltage parameter offsets $\{V1(y, i), V2(y, i), V3(y, i)\}$.

In addition, the memory controller 110 may perform a reading parameter learning procedure to establish a certain data set among the one or more data sets in the aforementioned at least one reading-voltage control database (e.g., the reading-voltage control database 116D and/or the reading-voltage control database 120D), and more particularly, perform the local linear regression mentioned above to generate predicted data $\{V\_predict(y, i) | i=i\_min, \ldots, i\_max\}$ of the predicted reading voltage parameter offset V_predict(y), such as the predicted data $\{V\_predict(y, i)\}$ respectively corresponding to the multiple candidate values $\{Bit0\_diff(y, i)\}$, in order to complete the data set. As a result, the data $\{(Bit0\_diff(y, i), V\_predict(y, i)) | i=i\_min, \ldots, i\_max\}$ in the data set may indicate the nonlinear relationship between the bit-zero count difference Bit0_diff(y) and the predicted reading voltage parameter offset V_predict(y), such as the nonlinear relationship as illustrated with the curve shown in FIG. 9. During performing the local linear regression for a target candidate value Bit0_diff(y, i0) corresponding to i=i0 to make the associated target data (Bit0_diff(y, i0), V_predict(y, i0)) among the data $\{(Bit0\_diff(y, i), V\_predict(y, i))\}$ as accurate as possible, the memory controller 110 may determine weighting values $\{w_i\}$ of the reading voltage parameter offsets $\{Vj(y, i)\}$ respectively corresponding to the multiple candidate values $\{Bit0\_diff(y, i)\}$ according to the predetermined weighting function w. For example, when determining the weighting values $\{w_i\}$ according to the predetermined weighting function w, the memory controller 110 may perform the following operations:

(1) the memory controller 110 may configure a weighting value $w_{i0}$ of the reading voltage parameter offsets $\{V1(y, i0), \ldots, Vm(y, i0)\}$ (e.g., the reading voltage parameter offsets $\{V1(y, i0), V2(y, i0), V3(y, i0)\}$, if m=3) corresponding to the target candidate value Bit0_diff(y, i0) to be the maximum weighting value among all weighting values $\{w_i\}$;

(2) the memory controller 110 may configure a weighting value $w_{i1}$ of the reading voltage parameter offsets $\{V1(y, i1), \ldots, Vm(y, i1)\}$ (e.g., the reading voltage parameter offsets $\{V1(y, i1), V2(y, i1), V3(y, i1)\}$, if m=3) corresponding to at least one adjacent candidate value Bit0_diff(y, i1) to be less than the weighting value $w_{i0}$ and greater than the remaining weighting values among all weighting values $\{w_i\}$; and (3) the memory controller 110 may configure a weighting value $w_{i2}$ of the reading voltage parameter offsets $\{V1(y, i2), \ldots, Vm(y, i2)\}$ (e.g., the reading voltage parameter offsets $\{V1(y, i2), V2(y, i2), V3(y, i2)\}$, if m=3) corresponding to at least one farther candidate value Bit0_diff(y, i2) to be less than the weighting values $\{w_{i0}, w_{i1}\}$ and greater than the remaining weighting values among all weighting values $\{w_i\}$;

where the rest may be deduced by analogy, but the present invention is not limited thereto. The aforementioned at least one adjacent candidate value Bit0_diff(y, i1) may comprise two adjacent candidate values {Bit0_diff(y, i1)} next to the target candidate value Bit0_diff(y, i0), such as the candidate values Bit0_diff(y, (i0−1)) and Bit0_diff(y, (i0+1)) respectively corresponding to i=(i0−1) and i=(i0+1), and both of the weighting value $w_{i0-1}$ of the reading voltage parameter offsets {V1(y, (i0−1)), ..., Vm(y, (i0−1))} corresponding to the candidate value Bit0_diff(y, (i0−1)) and the weighting value $w_{i0+1}$ of the reading voltage parameter offsets {V1(y, (i0+1)), ..., Vm(y, (i0+1))} corresponding to the candidate value Bit0_diff(y, (i0+1)) may be equal to the weighting value $w_{i1}$. The aforementioned at least one farther candidate value Bit0_diff(y, i2) may comprise two farther candidate values {Bit0_diff(y, i2)} next to the two adjacent candidate values Bit0_diff(y, (i0−1)) and Bit0_diff(y, (i0+1)), respectively, such as the candidate values Bit0_diff(y, (i0−2)) and Bit0_diff(y, (i0+2)) respectively corresponding to i=(i0−2) and i=(i0+2), and both of the weighting value $w_{i0-2}$ of the reading voltage parameter offsets {V1(y, (i0−2)), ..., Vm(y, (i0−2))} corresponding to the candidate value Bit0_diff(y, (i0−2)) and the weighting value $w_{i0+2}$ of the reading voltage parameter offsets {V1(y, (i0+2)), ..., Vm(y, (i0+2))} corresponding to the candidate value Bit0_diff(y, (i0+2)) may be equal to the weighting value $w_{i2}$.

Figure 10:
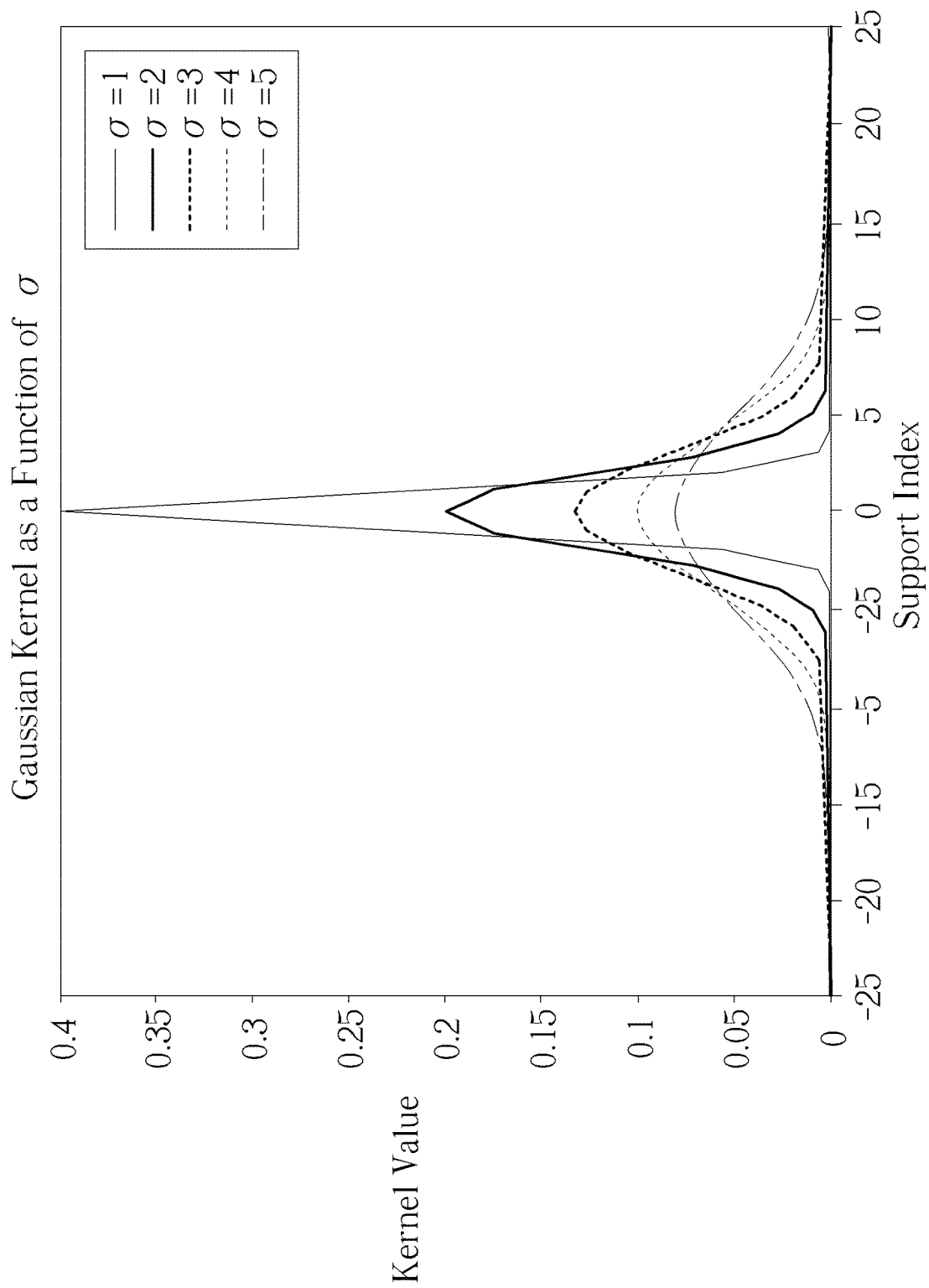
FIG. 10 is a diagram illustrating some examples of a predetermined weighting function involved with the local linear regression control scheme shown in FIG. 9 according to an embodiment of the present invention.

FIG. 10 illustrates some examples of the predetermined weighting function w involved with the local linear regression control scheme shown in FIG. 9 according to an embodiment of the present invention. The predetermined weighting function w for performing the local linear regression mentioned above may be implemented by way of a Gaussian Kernel as a function of a predetermined parameter σ greater than zero (labeled "Gaussian Kernel as a Function of σ" for brevity), and the sharpness at the center of the curve of the predetermined weighting function w may vary with respect to the predetermined parameter σ. As shown in FIG. 10, the horizontal axis may represent a support index, and the vertical axis may represent a kernel value. For example, the predetermined weighting function w may be expressed as follows:

$$w(x, x_0) = \exp(-1 * ((x-x_0)^2/(2*\sigma^2))) = e^{\wedge}(-1*((x-x_0)^2/(2*\sigma^2)));$$

where "exp( )" may represent the exponential function, "$x_0$" may represent the target candidate value Bit0_diff(y, i0), and "x" may represent the aforementioned any candidate value Bit0_diff(y, i), but the present invention is not limited thereto. According to some viewpoints, the above equation may be rewritten as follows:

$$w(x, x_0) = \exp(-1*((\|x-x_0\|^2)/(2*\sigma^2))) = e^{\wedge}(-1*((\|x-x_0\|^2)/(2*\sigma^2))).$$

In addition, the memory controller 110 may set the predetermined parameter σ in advance according to a default setting or a user setting of the memory device 100, in order to control the sharpness at the center of the curve of the predetermined weighting function w. For example, the memory controller 110 may set σ=0.1 to make the curve of the predetermined weighting function w implemented by way of the Gaussian Kernel be much sharper. In some examples, the predetermined parameter a may vary.

Some implementation details of the local linear regression control scheme shown in FIG. 9 may be further described as follows. According to some embodiments, regarding the same programming state index y, the bit-zero count difference Bit0_diff(y) and the multiple candidate values {Bit0_diff(y, i)} thereof may be rewritten as the bit-zero count difference Bit0_diff (or "D" for brevity) and the multiple candidate values {Bit0_diff(i)}(or "{D(i)}" for brevity) thereof, respectively, the reading voltage parameter offsets {V1(y), V2(y), V3(y)} and the reading voltage parameter offsets {V1(y, i), ..., Vm(y, i)}(e.g., the reading voltage parameter offsets {V1(y, i), V2(y, i), V3(y, i)}) may be rewritten as the reading voltage parameter offsets {V1, V2, V3} and the reading voltage parameter offsets {V1(i), ..., Vm(i)}(e.g., the reading voltage parameter offsets {V1(i), V2(i), V3(i)}), respectively, the reading voltage code offsets {Vc1(y), Vc2(y), Vc3(y)} and the reading voltage offsets {Vth1(y), Vth2(y), Vth3(y)} may be rewritten as the reading voltage code offsets {Vc1, Vc2, Vc3} and the reading voltage offsets {Vth1, Vth2, Vth3}, respectively, and the predicted reading voltage parameter offset V_predict (y) and the predicted data {V_predict(y, i)} thereof may be rewritten as the predicted reading voltage parameter offset V_predict (or "P" for brevity) and the predicted data {V_predict(i)}(or "{P(i)}" for brevity) thereof, respectively. During performing the local linear regression, the memory controller 110 may generate the predicted reading voltage parameter offset V_predict(y) according to a reading voltage prediction function f(Bit0_diff) corresponding to the reading voltage prediction model as follows:

$$P = f(\text{Bit0\_diff}) = x_0 * \beta;$$

where "P" may represent the predicted reading voltage parameter offset V_predict(y), "$x_0$" may represent the target candidate value Bit0_diff(y, i0) corresponding to i=i0 among the multiple candidate values {Bit0_diff(y, i)} of the bit-zero count difference Bit0_diff(y), and β may represent a linear regression coefficient, but the present invention is not limited thereto. For example, the memory controller 110 may calculate the linear regression coefficient β as follows:

$$\beta(x_0) = (X^T W X)^{-1} X^T W v;$$

where "X" may represent a bit-zero count difference candidate value matrix, "W" may represent a weighting matrix corresponding to the predetermined weighting function w, and "v" may represent a reading voltage parameter offset matrix. The bit-zero count difference candidate value matrix X may be implemented as a matrix of the multiple candidate values {Bit0_diff(y, i)} of the bit-zero count difference Bit0_diff(y), with the multiple candidate values {Bit0_diff (y, i)} being arranged as the elements of the bit-zero count difference candidate value matrix X. The weighting matrix W may be implemented as a matrix of the weighting values {$w_i$} corresponding to the multiple candidate values {Bit0_diff(y, i)} of the bit-zero count difference Bit0_diff(y), with the weighting values {$w_i$} such as the weighting values {$w_{i\_min}$, ..., $w_{i0-2}$, $w_{i0-1}$, $w_{i0}$, $w_{i0+1}$, $w_{i0+2}$, ..., $w_{i\_max}$} being arranged as the diagonal elements of the weighting matrix W, for example, starting from the upper left corner thereof, and the remaining elements in the weighting matrix W may be equal to zero. The reading voltage parameter offset matrix v may be implemented as a matrix of the reading voltage parameter offsets {V1(y, i), ..., Vm(y, i)}(e.g., the reading voltage parameter offsets {V1(y, i), V2(y, i), V3(y, i)}, if m=3), with the reading voltage parameter offsets {V1(y, i), ..., Vm(y, i)} such as the reading voltage parameter offsets {V1(y), V2(y), V3(y)} illustrated with the small circles shown in FIG. 9 being arranged as the elements of the reading voltage parameter offset matrix v.

According to some embodiments, it may be assumed that the multiple candidate programming states {PS(1), ..., PS(Y)} are stable. In this situation, the distribution illustrated with the curve shown in FIG. 5 may be stable without varying with respect to time, and the reading voltage parameter offsets {Vj(y, i)} (e.g., the three reading voltage parameter offsets V1(y, i), V2(y, i) and V3(y, i)) corresponding to the same candidate value Bit0_diff(y, i) that are collected by the memory controller 110 may be equal to each other and may be illustrated with a same reading voltage parameter offset V(y, i) corresponding to this candidate value Bit0_diff (y, i), causing the curve of the predicted reading voltage parameter offset V_predict(y) to pass through the same reading voltage parameter offset V(y, i), but the present invention is not limited thereto. In general, the multiple candidate programming states {PS(1), ..., PS(Y)} may be unstable and the distribution illustrated with the curve shown in FIG. 5 may vary with respect to time. When there is a need, the memory controller 110 may update any reading voltage parameter offset Vj(y, i) among the reading voltage parameter offsets {Vj(y, i)} in the one or more data sets, to make the aforementioned at least one reading-voltage control database (e.g., the reading-voltage control database 116D and/or the reading-voltage control database 120D) be up-to-date, in order to guarantee the overall performance.

reading voltage parameter offsets {Vj(y, i)} within the reading voltage parameter offsets {V1(y, i), ... Vm(y, i)} (e.g., the reading voltage parameter offsets {V1(y, i), V2(y, i), V3(y, i)}, if m=3) corresponding to the same candidate value Bit0_diff(y, i) may vary, and more particularly, may be equal to any of multiple positive integers such as {2, 3, 4, ...}. In some examples, the memory controller 110 may generate the predicted reading voltage parameter offset V_predict(y) in real time, having no need to store the predicted reading voltage parameter offset V_predict(y) in the aforementioned at least one reading-voltage control database.

TABLE 2

| Bit0_diff(y) | ... | 500 | ... |
|---|---|---|---|
| V1(y) | ... | 2 | ... |
| V2(y) | ... |  | ... |
| V3(y) | ... |  | ... |
| V_predict(y) | ... |  | ... |

TABLE 1

| Bit0_diff(y) | ... |
|---|---|
| V1(y) | ... |
| V2(y) | ... |
| V3(y) | ... |
| V_predict(y) | ... |

TABLE 3

| Bit0_diff(y) | ... | 500 | 1000 | ... |
|---|---|---|---|---|
| V1(y) | ... | 2 | 3 | ... |
| V2(y) | ... | 3 | 5 | ... |
| V3(y) | ... | 2 | 4 | ... |
| V_predict(y) | ... | 2 | 4 | ... |

TABLE 4A

| D | −10000 | −9500 | −9000 | −8500 | −8000 | −7500 | −7000 | −6500 | −6000 | −5500 |
|---|---|---|---|---|---|---|---|---|---|---|
| V1 | −58 | −52 | −50 | −44 | −44 | −38 | −32 | −28 | −28 | −22 |
| V2 | −56 | −52 | −48 | −42 | −46 | −36 | −34 | −30 | −28 | −22 |
| V3 | −56 | −54 | −46 | −44 | −40 | −40 | −30 | −32 | −22 | −28 |
| P | −56 | −56 | −56 | −48 | −43 | −37 | −32 | −29 | −27 | −24 |

TABLE 4B

| D | −5000 | −4500 | −4000 | −3500 | −3000 | −2500 | −2000 | −1500 | −1000 | −500 |
|---|---|---|---|---|---|---|---|---|---|---|
| V1 | −20 | −18 | −18 | −12 | −16 | −8 | −8 | −4 | −4 | −2 |
| V2 | −26 | −22 | −16 | −14 | −12 | −12 | −8 | −4 | −4 | −2 |
| V3 | −24 | −26 | −12 | −16 | −12 | −10 | −4 | −8 | −6 | −2 |
| P | −23 | −22 | −15 | −15 | −14 | −10 | −6 | −6 | −4 | −2 |

Table 1 illustrates an example of a format of any data set among the one or more data sets in the aforementioned at least one reading-voltage control database (e.g., the reading-voltage control database 116D and/or the reading-voltage control database 120D) at a time point t1, where the symbol " ... " may indicate that some blank columns may be omitted, and regarding the programming state index y, the memory controller 110 may store the bit-zero count difference Bit0_diff(y), the reading voltage parameter offsets V1(y), V2(y) and V3(y) and the predicted reading voltage parameter offset V_predict(y) into the aforementioned any data set in the aforementioned at least one reading-voltage control database according to the format shown in Table 1, but the present invention is not limited thereto. According to some embodiments, the format (e.g., the table format) of the data set may vary. For example, the predetermined reading voltage parameter offset count m such as the number of

TABLE 4C

| D | 500 | 1000 | 1500 | 2000 | 2500 | 3000 | 3500 | 4000 | 4500 | 5000 |
|---|---|---|---|---|---|---|---|---|---|---|
| V1 | 4 | 4 | 6 | 8 | 10 | 12 | 14 | 24 | 22 | 20 |
| V2 | 2 | 6 | 6 | 8 | 14 | 14 | 16 | 18 | 18 | 24 |
| V3 | 2 | 6 | 8 | 10 | 12 | 18 | 18 | 20 | 22 | 20 |
| P | 2 | 5 | 6 | 8 | 12 | 14 | 16 | 20 | 20 | 21 |

TABLE 4D

| D | 5500 | 6000 | 6500 | 7000 | 7500 | 8000 | 8500 | 9000 | 9500 | 10000 |
|---|---|---|---|---|---|---|---|---|---|---|
| V1 | 26 | 24 | 26 | 28 | 32 | 36 | 42 | 44 | 54 | 60 |
| V2 | 22 | 24 | 28 | 28 | 32 | 38 | 40 | 54 | 50 | 58 |
| V3 | 24 | 26 | 26 | 32 | 36 | 32 | 44 | 50 | 56 | 56 |
| P | 23 | 25 | 26 | 29 | 33 | 35 | 41 | 46 | 53 | 57 |

Table 2 illustrates an example of the latest information in the aforementioned any data set at a time point t2, Table 3 illustrates an example of the latest information in the data set at a time point t3, and Tables 4A-4D illustrate an example of the latest information in the data set at a time point t4, where t1<t2<t3<t4, the symbol "..." may indicate that some blank columns may be omitted, and for better comprehension, the reading voltage parameter offsets {V1(y), V2(y), V3(y)} and the predicted reading voltage parameter offset V_predict(y) may be implemented as the reading voltage code offsets {Vc1(y), Vc2(y), Vc3(y)} and the predicted reading voltage code offset Vc_predict(y), respectively, but the present invention is not limited thereto. According to some embodiments, the latest information in the data set at any time point among the time points t1, t2, t3 and t4 and/or the data amount of the data set may vary. For example, the memory controller 110 may fill the data set with a default value such as 0xFFFF in advance to make Table 1 be full of the default value at the time point t1, and the blank columns shown in Tables 2 and 3, as well as the blank parts of the column starting with "500" in Table 2, may also be full of the default value. The default value may indicate that updating with new information is needed to complete the data set, and the memory controller 110 may update the data set as shown in Tables 4A-4D and replace all parts having the default value in the data set with the latest information, respectively. In some examples, the reading voltage parameter offsets {V1(y), V2(y), V3(y)} and the predicted reading voltage parameter offset V_predict(y) may be implemented as the reading voltage offsets {Vth1(y), Vth2(y), Vth3(y)} and the predicted reading voltage offset Vth_predict(y), respectively. According to some viewpoints, Tables 4A-4D may be regarded as multiple sub-tables of one table, and their table contents may be arranged in the order of Tables 4A, 4B, 4C and 4D within the one table mentioned above, where the table contents of Tables 4B-4D may be regarded as subsequent table contents coming after the table contents of Table 4A.

During a predetermined time period T0 (e.g., a time period between two time points t0a and t0b, in a situation where t0a<t0b<t1) corresponding to an initial state of the memory device 100, the memory controller 110 may record the (Y−1) optimal reading voltage parameters {V_Opt(y)|y=1, ..., (Y−1)}(e.g., the optimal reading voltage parameters {V_Opt(1), ..., V_Opt(Y−1)}) of the predetermined time period T0 to be (Y−1) default reading voltage parameters {V_Default(y)|y=1, ..., (Y−1)}(e.g., the default reading voltage parameters {V_Default(1), ..., V_Default(Y−1)}), respectively, and record the (Y−1) bit-zero counts {Bit0} corresponding to the default reading voltage parameters {V_Default(y)|y=1, ..., (Y−1)} to be the reference bit-zero counts {Bit0_ref(y)|y=1, ..., (Y−1)}(e.g., the reference bit-zero count Bit0_ref(y) shown in FIG. 5, and the reference bit-zero counts Bit0_ref(y1), Bit0_ref(y2) and Bit0_ref(y3) shown in FIG. 6), respectively, where the initial state may comprise the initial distribution state of the bit-zero count Bit0 with respect to the reading voltage parameter V, such as the initial distribution as illustrated with the curve shown in FIG. 5. For example, when using the reading voltage code Vc as the representative of the reading voltage Vth, the memory controller 110 may record the (Y−1) optimal reading voltage codes {Vc_Opt(y)|y=1, ..., (Y−1)}(e.g., the optimal reading voltage codes {Vc_Opt(1), ..., Vc_Opt(Y− 1)}) of the predetermined time period T0 to be (Y−1) default reading voltage codes {Vc_Default(y)|y=1, ..., (Y−1)}(e.g., the default reading voltage codes {Vc_Default(1), ..., Vc_Default(Y−1)}, for performing the read retry procedure, but the present invention is not limited thereto. In some examples, the memory controller 110 may record the (Y−1) optimal reading voltages {Vth_Opt(y)|y=1, ..., (Y−1)}(e.g., the optimal reading voltages {Vth_Opt(1), ..., Vth_Opt(Y−1)}) of the predetermined time period T0 to be (Y−1) default reading voltages {Vth_Default(y)|y=1, ..., (Y−1)}(e.g., the default reading voltages {Vth_Default(1), ..., Vth_Default(Y−1)}, respectively, for performing the read retry procedure. In addition, the memory controller 110 may store the (Y−1) default reading voltage parameters {V_Default(y)|y=1, ..., (Y−1)} and the reference bit-zero counts {Bit0_ref(y)|y=1, ..., (Y−1)} into the predetermined region (e.g., the system region) within the NV memory 120. For example, the distribution state of the bit-zero count Bit0 with respect to the reading voltage parameter V may vary due to some reasons, and the (Y−1) optimal reading voltage parameters {V_Opt(y)|y=1, ..., (Y−1)} may become different from that of the predetermined time period T0. The memory controller 110 may refer to the (Y−1) default reading voltage parameters {V_Default(y)|y=1, ..., (Y−1)} and the reference bit-zero counts {Bit0_ref(y)|y=1, ..., (Y−1)} that have been stored in advance, to perform the associated operations.

When starting performing the read retry procedure, regarding any case among all of the cases of y=1, ... and y=(Y−1), the memory controller 110 may use the default reading voltage code Vc_Default(y) to control the NV memory 120 to try reading according to the default reading voltage Vth_Default(y) corresponding to the default reading voltage code Vc_Default(y) to obtain the bit-zero count Bit0, and calculate the bit-zero count difference Bit0_diff(y), and more particularly, perform filtering on a pre-filtering value $Bit0\_diff_{Pre\text{-}filtering}(y)$ (e.g., the difference (Bit0−Bit0_ref(y))) between the bit-zero count Bit0 and the reference bit-zero count Bit0_ref(y)) of the bit-zero count difference Bit0_diff(y) to generate a filtered value of the bit-zero count difference Bit0_diff(y) as follows:

$$Bit0\_diff(y)=((Bit0\_diff_{Pre\text{-}filtering}(y)/M)*M)=(((Bit0-Bit0\_ref(y))/M)*M);$$

where the memory controller 110 may perform integer calculation in the above equation to make the operation "/" thereof be integer division in which the fractional part (or the remainder) is discarded, "M" may be a predetermined bit-zero-count-difference filtering parameter of the bit-zero count difference Bit0_diff(y), and the predetermined bit-zero-count-difference filtering parameter M may be a positive integer greater than one, but the present invention is not limited thereto. In addition, the memory controller 110 may perform a scanning operation according to the reading voltage scanning control scheme, in order to determine a value V(y) on the V axis (e.g., a value Vc(y) on the Vc axis, or a value Vth(y) on the Vth axis) that correspond to a local minimum of the bit-zero count variation ΔBit0 to be the latest optimal reading voltage parameter V_Opt(y) (e.g., the latest optimal reading voltage code Vc_Opt(y) or the latest optimal reading voltage Vth_Opt(y)), and calculate a best value V_best(y) such as the difference (V_Opt(y)−V_Default(y)) between the latest optimal reading voltage parameter V_Opt(y) and the default reading voltage parameter V_Default(y) to be the reading voltage parameter offset Vj(y, i).

For better comprehension, when the reading voltage parameter offsets {V1(y), V2(y), V3(y)} and the predicted reading voltage parameter offset V_predict(y) are implemented as the reading voltage code offsets {Vc1(y), Vc2(y), Vc3(y)} and the predicted reading voltage code offset Vc_predict(y), respectively, the value V(y) on the V axis, the latest optimal reading voltage parameter V_Opt(y), the best value V_best(y), the default reading voltage parameter V_Default(y) and the reading voltage parameter offset Vj(y, i) may represent the value Vc(y) on the Vc axis, the latest optimal reading voltage code Vc_Opt(y), the best value Vc best(y), the default reading voltage code Vc_Default(y) and the reading voltage code offset Vc_j(y, i), respectively, but the present invention is not limited thereto. According to some embodiments, when the reading voltage parameter offsets {V1(y), V2(y), V3(y)} and the predicted reading voltage parameter offset V_predict(y) are implemented as the reading voltage offsets {Vth1(y), Vth2(y), Vth3(y)} and the predicted reading voltage offset Vth_predict(y), respectively, the value V(y) on the V axis, the latest optimal reading voltage parameter V_Opt(y), the best value V_best (y), the default reading voltage parameter V_Default(y) and the reading voltage parameter offset Vj(y, i) may represent the value Vth(y) on the Vth axis, the latest optimal reading voltage Vth_Opt(y), the best value Vth_best(y), the default reading voltage Vth_Default(y) and the reading voltage offset Vth_j(y, i), respectively.

For example, when Bit0=74327, Bit0_ref(y)=73728, M=500 and V_best(y)=2, the memory controller 110 may determine that Bit0_diff(y)=(((74327−73728)/500)*500)= 500 and V1(y)=V_best(y)=2, and more particularly, obtain the latest information (Bit0_diff(y)=500, V1(y)=2), and fill {500, 2} into a predetermined column corresponding to Bit0_diff(y)=500 as shown in Table 2. In addition, the memory controller 110 may execute the read retry procedure multiple times in response to multiple errors, respectively. For example, when Bit0=75327, Bit0_ref(y)=73728, M=500 and V_best(y)=3, the memory controller 110 may determine that Bit0_diff(y)=(((75327−73728)/500)*500)=500 and V2(y)=V_best(y)=3, and more particularly, obtain the latest information (Bit0_diff(y)=500, V2(y)=3), and complete filling {500, 2, 3} into the predetermined column corresponding to Bit0_diff(y)=500, where the rest may be deduced by analogy. As a result, the memory controller 110 may perform similar operations to obtain the latest information {{(Bit0_diff(y)=500, V1(y)=2), (Bit0_diff(y)=500, V2(y)= 3), (Bit0_diff(y)=500, V3(y)=2)}, {(Bit0_diff(y)=1000, V1(y)=3), (Bit0_diff(y)=1000, V2(y)=5), (Bit0_diff(y)= 1000, V3(y)=4)}, dynamically generate or update the predicted reading voltage parameter offset V_predict(y), and complete filling {500, 2, 3, 2, 2} and {1000, 3, 5, 4, 4} into the predetermined columns corresponding to Bit0_diff(y)= 500 and Bit0_diff(y)=1000 as shown in Table 3, respectively.

In the example shown in Table 3, the memory controller 110 may dynamically generate or update the predicted reading voltage parameter offset V_predict(y) at any time point, and more particularly, generate or update the predicted reading voltage parameter offset V_predict(y) when an accumulated reading voltage parameter offset count CNT (Vj(y, i)) such as the number of reading voltage parameter offsets {Vj(y, i)} corresponding to the same candidate value Bit0_diff(y, i) reaches the predetermined reading voltage parameter offset count m, but the present invention is not limited thereto. According to some embodiments, the memory controller 110 may generate or update the predicted reading voltage parameter offset V_predict(y) at one or more subsequent time points, for example, when the memory controller 110 has completed filling the multiple candidate values {Bit0_diff(y, i)} and all reading voltage parameter offsets {Vj(y, i)} corresponding to the multiple candidate values {Bit0_diff(y, i)} into the format shown in Table 1.

No matter whether the memory controller 110 generates the predicted reading voltage parameter offset V_predict(y) in the example shown in Table 3, the memory controller 110 may execute the read retry procedure multiple times in response to the multiple errors, respectively, and more particularly, perform similar operations to obtain the latest information {{(Bit0_diff(y)=−10000, V1(y)=−58), (Bit0_diff(y)=−10000, V2(y)=−56), (Bit0_diff(y)=−10000, V3(y)=−56)}, . . . , {(Bit0_diff(y)=10000, V1(y)=60), (Bit0_diff(y)=10000, V2(y)=58), (Bit0_diff(y)=10000, V3(y)=56)}, dynamically generate or update the predicted reading voltage parameter offset V_predict(y), and complete filling {{−10000, −58, −56, −56, −56}, . . . , {10000, 60, 58, 56, 57} into the predetermined columns corresponding to Bit0_diff(y)={−10000, . . . , 10000} as shown in Tables 4A-4D, respectively. For example, the memory controller 110 may have generated a portion of the predicted data {V_predict(y, i)}(e.g., the predicted data "2" in the column corresponding to Bit0_diff(y)=500 and the predicted data "4" in the column corresponding to Bit0_diff(y)=1000 as shown in Table 3) of the predicted reading voltage parameter offset V_predict(y) at the time point t3, and may have updated the predicted data {V_predict(y, i)}(e.g., the predicted data "2" in the column corresponding to Bit0_diff(y)= 500 and the predicted data "5" in the column corresponding to Bit0_diff(y)=1000 as shown in Tables 4A-4D) of the predicted reading voltage parameter offset V_predict(y) at the time point t4.

In the example shown in Tables 4A-4D, the memory controller 110 may prevent storing any information into any column corresponding to Bit0_diff(y)=0, but the present invention is not limited thereto. According to some embodiments, the memory controller 110 may store central information {0, 0, 0, 0, 0} into a predetermined central column corresponding to Bit0_diff(y)=0, where the predetermined central column may be positioned next to the right most column of Table 4B, and more particularly, may be inserted between the column corresponding to Bit0_diff(y)=−500 as shown in Table 4B and the column corresponding to Bit0_diff(y)=500 as shown in Table 4C. For brevity, similar descriptions for these embodiments are not repeated in detail here.

Figure 11:
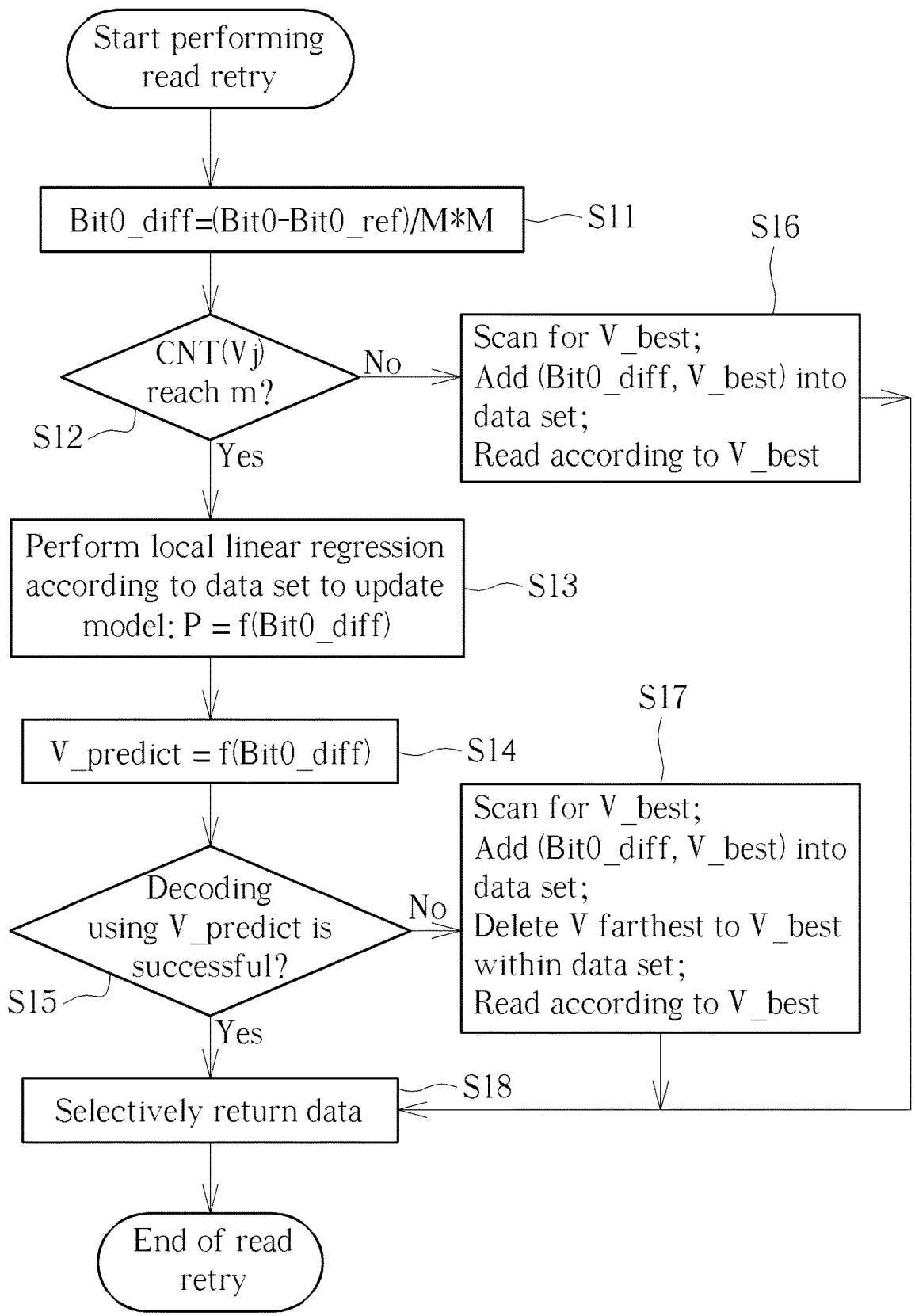
FIG. 11 is a diagram illustrating a working flow of the method according to an embodiment of the present invention.

FIG. 11 is a diagram illustrating a working flow of the method according to an embodiment of the present invention, where the reading parameter learning procedure for establishing and updating the one or more data sets in the aforementioned at least one reading-voltage control database (e.g., the reading-voltage control database 116D and/or the reading-voltage control database 120D) may be integrated into the read retry procedure to enhance the overall performance. The memory controller 110 may receive the plurality of host commands from the host device 50 through the transmission interface circuit 118, for performing data access (e.g., data reading and data writing/programming) on the NV memory 120 according to the plurality of host commands, and perform the reading parameter learning procedure to generate or update the predicted data {V_predict(y, i)} of the predicted reading voltage parameter offset V_predict(y) regarding the adjustment of the reading voltage parameter V (e.g., the reading voltage code Vc and the reading voltage Vth), such as that shown in Tables 4A-4D, for determining the latest optimal reading voltage parameter V_Opt(y) in real time by the prediction of the predicted reading voltage parameter offset V_predict(y), in order to accurately determine the respective programming states {PS(y)} of the memory cells in the memory cell group, and therefore maintain the correctness of the data reading. For example, the latest optimal reading voltage parameter V_Opt(y) may represent the latest and optimal value of the reading voltage parameter V, for distinguishing two adjacent candidate programming states {PS(y)} among the multiple candidate programming states {PS(1), . . . , PS(Y)} regarding the memory cell group, such as any set of adjacent candidate programming states among the set of candidate programming states {PS(y1), PS(y1+1)}, the set of candidate programming states {PS(y2), PS(y2+1)} and the set of candidate programming states {PS(y3), PS(y3+1)}.

In Step S11, when starting performing the read retry procedure, regarding any case among all of the cases of y=1, . . . and y=(Y−1), the memory controller 110 may use the default reading voltage code Vc_Default(y) to control the NV memory 120 to try reading according to the default reading voltage Vth_Default(y) to obtain the bit-zero count Bit0, and calculate the bit-zero count difference Bit0_diff(y) as mentioned above to determine that Bit0_diff(y)=(((Bit0−Bit0_ref(y))/M)*M) (labeled "Bit0_diff=(Bit0−Bit0_ref)/M*M" for brevity).

In Step S12, the memory controller 110 may determine whether the accumulated reading voltage parameter offset count CNT(Vj(y, i)) such as the number of reading voltage parameter offsets {Vj(y, i)} corresponding to the same candidate value Bit0_diff(y, i) reaches the predetermined reading voltage parameter offset count m (labeled "CNT(Vj) reach m" for brevity). If Yes, Step S13 is entered; if No, Step S16 is entered.

In Step S13, the memory controller 110 may perform the local linear regression according to the data set to update the reading voltage prediction function f(Bit0_diff) corresponding to the reading voltage prediction model, and more particularly, update the reading voltage prediction model such as the model implemented with $P=f(Bit0\_diff)=x_0*\beta$, for example, $\beta(x_0)=(X^TWX)^{-1}X^TWv$ (labeled "P=f(Bit0_diff)" for brevity), for fitting the local curve of the predicted reading voltage parameter offset V_predict(y) into the corresponding local trend of the data set. The data set may comprise collected data regarding the adjustment of the reading voltage parameter V within the data set, such as the reading voltage parameter offsets {Vj(y, i)}, and the corresponding local trend of the data set may represent the corresponding local trend of the collect data. Taking the curve shown in FIG. 9 as an example, the local curve of the predicted reading voltage parameter offset V_predict(y) may represent a portion of the curve of the predicted reading voltage parameter offset V_predict(y) with respect to the bit-zero count difference Bit0_diff(y), where the curve of the predicted reading voltage parameter offset V_predict(y) may be a nonlinear curve.

In Step S14, the memory controller 110 may perform the prediction of the predicted reading voltage parameter offset V_predict(y) to generate or update the predicted data {V_predict(y, i)} of the predicted reading voltage parameter offset V_predict(y) according to the reading voltage prediction function f(Bit0_diff) that is just updated in Step S13 (labeled "V_predict=f(Bit0_diff)" for brevity), and more particularly, perform a read retry operation to try reading data according to the predicted data V_predict(y, i) corresponding to the bit-zero count difference Bit0_diff(y) among the predicted data {V_predict(y, i)}.

In Step S15, the memory controller 110 may determine whether the decoding (e.g., hard decoding and/or soft decoding) using the predicted reading voltage parameter offset V_predict(y) that is just generated (or predicted) in Step S14 is successful. If Yes (e.g., no decoding error such as any hard/soft decoding error occurs), Step S15 is entered; if No (e.g., at least one decoding error such as at least one hard/soft decoding error occurs), Step S17 is entered.

In Step S16, the memory controller 110 may scan for the best value V_best(y) regarding the adjustment of the reading voltage parameter V, and more particularly, perform a scanning operation according to the reading voltage scanning control scheme to determine the latest optimal reading voltage parameter V_Opt(y) and calculate the best value V_best(y) according to the latest optimal reading voltage parameter V_Opt(y) and the default reading voltage parameter V_Default(y) as mentioned above, add the latest information (Bit0_diff(y)=Bit0_diff(y, i), Vj(y)=V_best(y)) (labeled "(Bit0_diff, V_best)" for brevity) into the data set, and try reading data according to the best value V_best(y) (labeled "Read according to V_best" for brevity).

In Step S17, the memory controller 110 may scan for the best value V_best(y) regarding the adjustment of the reading voltage parameter V, and more particularly, perform a scanning operation according to the reading voltage scanning control scheme to determine the latest optimal reading voltage parameter V_Opt(y) and calculate the best value V_best(y) according to the latest optimal reading voltage parameter V_Opt(y) and the default reading voltage parameter V_Default(y) as mentioned above, add the latest information (Bit0_diff(y)=Bit0_diff(y, i), Vj(y)=V_best(y)) (labeled "(Bit0_diff, V_best)" for brevity) into the data set, delete old collected data such as the reading voltage parameter offset Vj(y, i) farthest to the best value V_best among all of the reading voltage parameter offsets {Vj(y, i)} corresponding to the same candidate value Bit0_diff(y, i) within the data set (labeled "Delete V farthest to V_best" for brevity), and try reading data according to the best value V_best(y) (labeled "Read according to V_best" for brevity).

In Step S18, the memory controller 110 may selectively return the data such as error-free data. For example, when Step S18 is executed after the execution of Step S15, the memory controller 110 may have obtained the error-free data from the decoding (e.g., the hard decoding and/or the soft decoding) using the predicted reading voltage parameter offset V_predict(y), and return the error-free data to the host device 50. For another example, when Step S18 is executed after the execution of any of Steps S16 and S17, if no uncorrectable ECC (UECC) error occurs when reading the data according to the best value V_best(y) from the NV memory 120, the memory controller 110 may return the error-free data to the host device 50; otherwise, the memory controller 110 may execute an error handling procedure, and return an error message to the host device 50, for indicating the occurrence of the UECC error.

For example, the one or more data sets in the aforementioned at least one reading-voltage control database (e.g., the reading-voltage control database 116D and/or the reading-voltage control database 120D) may comprise multiple data sets respectively corresponding to the cases of y=1, . . . and y=(Y−1). The memory controller 110 may establish and update the data set corresponding to the aforementioned any case among the multiple data sets respectively corresponding to the cases of y=1, . . . and y=(Y−1), and more particularly, perform the local linear regression mentioned above to generate and update the predicted data {V_predict(y, i)|i=i_min, . . . , i_max} of the predicted reading voltage parameter offset V_predict(y), such as the predicted data {V_predict(y, i)} respectively corresponding to the multiple candidate values {Bit0_diff(y, i)}. As the memory controller 110 may update any reading voltage parameter offset Vj(y, i) among the reading voltage parameter offsets {Vj(y, i)} in the data set to make the aforementioned at least one reading-voltage control database be up-to-date, the memory controller 110 may refer to the aforementioned at least one reading-voltage control database to read data correctly and efficiently without any error during performing the read retry procedure, where the data $\{(Bit0\_diff(y, i), V\_predict(y, i))|i=i\_min, \ldots, i\_max\}$ in the data set may accurately indicate the nonlinear relationship between the bit-zero count difference Bit0_diff(y) and the predicted reading voltage parameter offset V_predict(y), such as the nonlinear relationship as illustrated with the curve shown in FIG. 9. Therefore, the memory controller 110 may perform the data access control of the memory device 100 with the aid of the predicted information to guarantee the overall performance.

In addition, the memory controller 110 may perform the local linear regression mentioned above to update the reading voltage prediction model such as the model implemented with $P=f(Bit0\_diff)=x_0 * \beta$ (e.g., $\mu(x_0)=(X^TWX)^{-1}X^TWv$), and may use the predetermined weighting function w during performing the local linear regression to fit the local curve of the predicted reading voltage parameter offset V_predict (y) into the corresponding local trend of the collected data (e.g., the reading voltage parameter offsets $\{Vj(y, i)\}$) regarding the adjustment of the reading voltage parameter V in the data set, for maintaining the accuracy of the prediction of the predicted reading voltage parameter offset V_predict (y) to guarantee the correctness of the read data obtained from any read retry operation (e.g., the read retry operation mentioned in Step S14) in the read retry procedure. For brevity, similar descriptions for this embodiment are not repeated in detail here.

For better comprehension, the method may be illustrated with the working flow shown in FIG. 10, but the present invention is not limited thereto. According to some embodiments, one or more steps may be added, deleted, or changed in the working flow shown in FIG. 10. For example, the memory controller 110 may perform the reading parameter learning procedure (or the associated operations related to reading parameter learning) individually, having no need to integrate the reading parameter learning procedure into the read retry procedure. For another example, as long as the calculation capability of the memory controller 110 is sufficient, the memory controller 110 may perform the prediction of the predicted reading voltage parameter offset V_predict(y) to generate or update more predicted data of the predicted reading voltage parameter offset V_predict(y) in Step S14, and more particularly, refer to the pre-filtering value Bit0_diff$_{Pre-filtering}$(y), (e.g., the difference (Bit0–Bit0_ref(y)) between the bit-zero count Bit0 and the reference bit-zero count Bit0_ref(y)) of the bit-zero count difference Bit0_diff(y) to calculate a predicted value of the predicted reading voltage parameter offset V_predict(y) according to the reading voltage prediction function f(Bit0_diff) that is just updated in Step S13, to achieve the continuous mapping from the pre-filtering value Bit0_diff$_{Pre-filtering}$(y) of the bit-zero count difference Bit0_diff(y) to the predicted value of the predicted reading voltage parameter offset V_predict(y), such as the continuous mapping as illustrated with the curve shown in FIG. 9. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data access control of a memory device with aid of predicted information, the method being applied to a memory controller of the memory device, the memory device comprising the memory controller and a non-volatile (NV) memory, the NV memory comprising at least one NV memory element, the method comprising:
   receiving a plurality of host commands from a host device, for performing data access on the NV memory according to the plurality of host commands, wherein the data access comprises data reading; and
   performing a reading parameter learning procedure to generate predicted data of a predicted reading voltage parameter offset regarding adjustment of a reading voltage parameter, for maintaining correctness of the data reading, wherein the reading parameter learning procedure comprises:
      scanning for a best value regarding the adjustment of the reading voltage parameter, and adding latest information comprising the best value into a data set among one or more data sets in at least one reading-voltage control database;
      performing local linear regression according to the data set to update a reading voltage prediction function corresponding to a reading voltage prediction model, for fitting a local curve of the predicted reading voltage parameter offset into a corresponding local trend of the data set; and
      generating or updating the predicted data of the predicted reading voltage parameter offset according to the reading voltage prediction function;
   wherein the reading parameter learning procedure is integrated into a read retry procedure, and the memory controller is arranged to perform both of read retry and reading parameter learning in the read retry procedure.

2. The method of claim 1, wherein the memory controller is arranged to perform the reading parameter learning procedure to generate or update the predicted data of the predicted reading voltage parameter offset, for determining a latest optimal reading voltage parameter in real time by prediction of the predicted reading voltage parameter offset, wherein the latest optimal reading voltage parameter represents a latest and optimal value of the reading voltage parameter.

3. The method of claim 1, wherein the memory controller is arranged to perform the local linear regression to update the reading voltage prediction model, and use a predetermined weighting function during performing the local linear regression to fit the local curve of the predicted reading voltage parameter offset into the corresponding local trend of the data set, for maintaining accuracy of prediction of the predicted reading voltage parameter offset to guarantee correctness of read data obtained from a read retry operation.

4. The method of claim 3, wherein the data set comprise collected data regarding the adjustment of the reading voltage parameter within the data set, wherein the corresponding local trend of the data set represents the corresponding local trend of the collect data.

5. The method of claim 1, wherein the local curve of the predicted reading voltage parameter offset represents a portion of a curve of the predicted reading voltage parameter offset, wherein the curve of the predicted reading voltage parameter offset is a nonlinear curve.

6. The method of claim 1, wherein the reading parameter learning procedure further comprises:
   in response to a predetermined criterion being met, deleting old collected data farthest to the best value among a set of collected data regarding the adjustment of the reading voltage parameter within the data set.

7. The method of claim 6, wherein the reading voltage prediction function is a function of a bit-zero count difference; and the data set comprise collected data regarding the adjustment of the reading voltage parameter within the data set, the collected data corresponding to multiple candidate values of the bit-zero count difference, wherein the set of collected data represents collected data corresponding to a same candidate value among the multiple candidate values.

8. The method of claim 1, wherein the reading voltage prediction function is a function of a bit-zero count difference; and the data set comprise collected data regarding the adjustment of the reading voltage parameter within the data set, the collected data corresponding to multiple candidate values of the bit-zero count difference.

9. A memory controller of a memory device, the memory device comprising the memory controller and a non-volatile (NV) memory, the NV memory comprising at least one NV memory element, the memory controller comprising:
   a processing circuit, arranged to control the memory controller according to a plurality of host commands from a host device, to allow the host device to access the NV memory through the memory controller; and
   a transmission interface circuit, arranged to perform communications with the host device;
   wherein:
      the memory controller receives the plurality of host commands from the host device through the transmission interface circuit of the memory controller, for performing data access on the NV memory according to the plurality of host commands, wherein the data access comprises data reading; and
      the memory controller performs a reading parameter learning procedure to generate predicted data of a predicted reading voltage parameter offset regarding adjustment of a reading voltage parameter, for maintaining correctness of the data reading, wherein the reading parameter learning procedure comprises:
         scanning for a best value regarding the adjustment of the reading voltage parameter, and adding latest information comprising the best value into a data set among one or more data sets in at least one reading-voltage control database;
         performing local linear regression according to the data set to update a reading voltage prediction function corresponding to a reading voltage prediction model, for fitting a local curve of the predicted reading voltage parameter offset into a corresponding local trend of the data set; and
         generating or updating the predicted data of the predicted reading voltage parameter offset according to the reading voltage prediction function;
      wherein the reading parameter learning procedure is integrated into a read retry procedure, and the memory controller is arranged to perform both of read retry and reading parameter learning in the read retry procedure.

10. The memory device comprising the memory controller of claim 9, wherein the memory device comprises:
   the NV memory, configured to store information; and
   the memory controller, coupled to the NV memory, configured to control operations of the memory device.

11. An electronic device comprising the memory device of claim 10, and further comprising:
   the host device, coupled to the memory device, wherein the host device comprises:
      at least one processor, arranged for controlling operations of the host device; and
      a power supply circuit, coupled to the at least one processor, arranged for providing power to the at least one processor and the memory device;
   wherein the memory device provides the host device with storage space.

* * * * *